US010643336B2

United States Patent
Usikov et al.

(10) Patent No.: US 10,643,336 B2
(45) Date of Patent: May 5, 2020

(54) IMAGE PROCESSING APPARATUS AND METHOD FOR OBJECT BOUNDARY STABILIZATION IN AN IMAGE OF A SEQUENCE OF IMAGES

(71) Applicant: SONY CORPORATION, Tokyo (JP)

(72) Inventors: Daniel Usikov, Newark, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 15/913,246

(22) Filed: Mar. 6, 2018

(65) Prior Publication Data
US 2019/0279371 A1 Sep. 12, 2019

(51) Int. Cl.
*G06T 7/215* (2017.01)
*G06T 7/12* (2017.01)
(Continued)

(52) U.S. Cl.
CPC .......... *G06T 7/215* (2017.01); *G06K 9/00664* (2013.01); *G06K 9/6202* (2013.01);
(Continued)

(58) Field of Classification Search
CPC G06T 7/215; G06T 7/136; G06T 7/12; G06T 7/194; G06T 7/11; G06T 7/248;
(Continued)

(56) References Cited

U.S. PATENT DOCUMENTS

| 5,402,532 A | 3/1995 | Epstein et al. |
| 7,596,243 B2 | 9/2009 | Paniconi et al. |
| (Continued) |

FOREIGN PATENT DOCUMENTS

| JP | 2000-030040 A | 1/2000 |
| JP | 2015-501574 A | 1/2015 |
| WO | 2014/189484 A1 | 11/2014 |

OTHER PUBLICATIONS

Extended European Search Report of EP Application No. 19157498.7, dated May 13, 2019, 10 pages of EESR.
(Continued)

*Primary Examiner* — Leon Flores
(74) *Attorney, Agent, or Firm* — Chip Law Group

(57) ABSTRACT

Various aspects of an image-processing apparatus and method for object boundary stabilization in an image of a sequence of image frames are disclosed. The image-processing apparatus includes an image processor that receives a depth image of a scene from a first-type of sensor and a color image of the scene from the second-type of sensor. The scene may comprise at least an object-of-interest. A first object mask of the object-of-interest is generated by a depth thresholding operation on the received depth image. Dangling-pixels artifact present on a first object boundary of the first object mask, are removed. The first object boundary is smoothened using a moving-template filter on the color image. A second object mask having a second object boundary is generated based on the smoothening of the first object boundary. The object-of-interest from the color image is extracted based on the generated second object mask.

28 Claims, 14 Drawing Sheets

(51) Int. Cl.
　　*G06T 7/194*　　(2017.01)
　　*G06T 7/246*　　(2017.01)
　　*G06K 9/00*　　(2006.01)
　　*G06K 9/62*　　(2006.01)
　　*G06T 5/00*　　(2006.01)
　　*G06T 7/136*　　(2017.01)
　　*G06T 7/11*　　(2017.01)

(52) U.S. Cl.
　　CPC ............ *G06K 9/6288* (2013.01); *G06T 5/008* (2013.01); *G06T 7/11* (2017.01); *G06T 7/12* (2017.01); *G06T 7/136* (2017.01); *G06T 7/194* (2017.01); *G06T 7/248* (2017.01); *G06T 2200/04* (2013.01); *G06T 2207/10016* (2013.01); *G06T 2207/10024* (2013.01); *G06T 2207/10028* (2013.01); *G06T 2207/10048* (2013.01); *G06T 2207/20201* (2013.01); *G06T 2207/20221* (2013.01); *G06T 2207/30196* (2013.01)

(58) Field of Classification Search
　　CPC . G06T 2207/10016; G06T 2207/10024; G06T 2207/10028; G06T 2207/10048; G06T 2207/20201; G06T 2207/20221; G06T 2207/30196; G06T 5/008; G06K 9/00664; G06K 9/6202; G06K 9/6288
　　See application file for complete search history.

(56) References Cited

U.S. PATENT DOCUMENTS

| | | | |
|---|---|---|---|
| 2011/0211749 | A1 | 9/2011 | Tan et al. |
| 2011/0273529 | A1 | 11/2011 | Lai et al. |
| 2012/0051631 | A1 | 3/2012 | Nguyen et al. |
| 2014/0294288 | A1 | 10/2014 | Nguyen et al. |
| 2015/0356716 | A1 | 12/2015 | Nguyen et al. |
| 2016/0065930 | A1 | 3/2016 | Chandra et al. |
| 2017/0109872 | A1 | 4/2017 | Nguyen et al. |
| 2017/0124717 | A1 | 5/2017 | Baruch et al. |
| 2017/0372510 | A1 | 12/2017 | Ye et al. |
| 2018/0089814 | A1 | 3/2018 | Nguyen et al. |

OTHER PUBLICATIONS

Office Action for JP Patent Application No. 2019-017062, dated Jan. 29, 2020, 05 pages of Office Action and 06 pages of English Translation.

Office Action for KR Patent Application No. 10-2019-0021699, dated Mar. 14, 2020, 08 pages of Office Action and 08 pages of English Translation.

IMAGE PROCESSING APPARATUS AND METHOD FOR OBJECT BOUNDARY STABILIZATION IN AN IMAGE OF A SEQUENCE OF IMAGES

CROSS-REFERENCE TO RELATED APPLICATIONS/INCORPORATION BY REFERENCE

None.

FIELD

Various embodiments of the disclosure relate to object segmentation and image background substitution technologies. More specifically, various embodiments of the disclosure relate to an image-processing apparatus and method for object boundary stabilization in an image of a sequence of image frames.

BACKGROUND

Recent advancements in the field of video surveillance systems, machine vision systems in the field of robotics and automotive industry, and consumer electronic (CE) devices are largely due to rapid technological development in image processing techniques. Although various object segmentation methods have been known to separate foreground objects from background of an image, the complexity, accuracy, and computational resource requirement varies based on an objective to be achieved. In depth-based object segmentation methods, the use of a depth map for an object segmentation may allow avoidance of many uncertainties in the object delineation process, as compared methods that use a color image alone. Existing depth sensors that provide a depth map are still lacking in accuracy and lag to match up with the increasing resolution of RGB cameras. For example, the depth map may contain shadowy areas, where the light from infrared (IR) emitters of depth sensors do not propagate, resulting in areas with unknown depth. In addition, the depth map may be most uncertain at the boundary of an object, where the depth drops sharply, and strongly fluctuates between image frames. The imperfectness in the depth map of modern depth sensors results in significant fluctuations on the boundary of a segmented object, especially visible between frames of a sequence of image frames, for example, a movie or other videos. The resulting artifacts are visually unpleasant to a viewer. Therefore, it may be desirable to reduce the amount of boundary fluctuation and stabilize the object boundary for precise object segmentation and enhanced background substitution.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method for object boundary stabilization in an image of a sequence of image frames is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
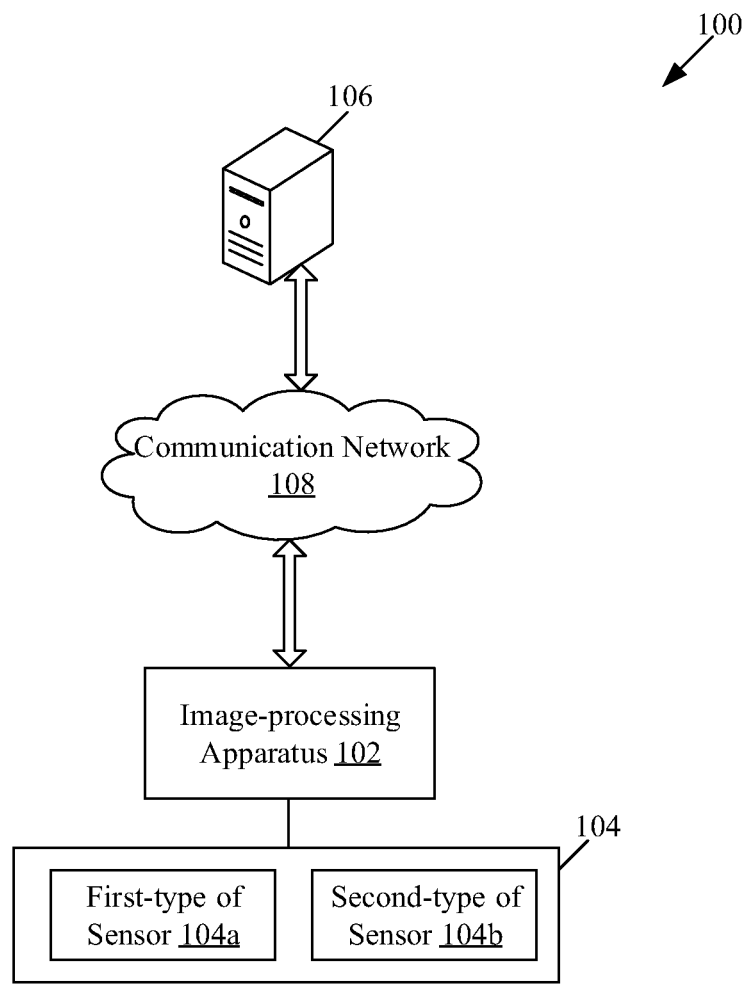
FIG. 1A is a block diagram that illustrates an exemplary network environment for object boundary stabilization in an image of a sequence of image frames, in accordance with an embodiment of the disclosure.

The following described implementations may be found in the disclosed image-processing apparatus and method for object boundary stabilization in an image of a sequence of image frames. Exemplary aspects of the disclosure may include an image-processing apparatus and a method that comprise receipt of a depth image of a scene from a first-type of sensor and a color image of the scene from a second-type of sensor. The first-type of sensor may be different from the second-type of sensor. The scene may comprise at least an object-of-interest. A first object mask of the object-of-interest may be obtained by a depth thresholding operation on the received depth image. Dangling-pixels artifact present on a first object boundary of the first object mask, may be removed. The first object boundary of the first object mask may be smoothened using a moving-template filter on the color image after removal of the dangling-pixels artifact. A second object mask having a second object boundary may be generated based on the smoothening of the first object boundary. The object-of-interest from the color image may be extracted based on the generated second object mask having the second object boundary.

In accordance with an embodiment, the processing of the color image of the scene may be restricted to a field-of-view (FOV) of the first-type of sensor for the extraction of the object-of-interest from the color image. A plurality of depth values greater than a threshold depth value may be excluded by the depth thresholding operation. The threshold depth value may correspond to a maximum depth value associated with pixels of the first object mask of the object-of-interest.

In accordance with an embodiment, zero-depth artifacts may be removed from the depth image. The zero-depth artifacts may correspond to areas with unknown depth values in the depth image. The pixels associated with the unknown depth values may be classified as background pixels or foreground pixels based on specified criteria. Further, an infrared (IR) shadow casted on the first object mask by a portion of the object-of-interest, may also be removed from the depth image. A background region outside the first object mask in the color image, may be dynamically updated for the removal of the IR shadow.

In accordance with an embodiment, the moving-template filter may be positioned on the color image to encompass a boundary pixel of the first object boundary such that the moving-template filter include a first set of pixels located in an interior region of the first object mask and a second set of pixels located in an exterior region outside the first object mask. Pixels with a maximum image gradient along a normal to the first object boundary within the moving-template filter, may be searched. The normal to the first object boundary may define a direction in which image gradients are computed. In accordance with an embodiment, a difference in a color value and a brightness value between the first set of pixels and the second set of pixels, may be computed. A boundary pixel may be identified as a candidate pixel for the smoothening of the first object boundary based on the computed difference in the color value and the brightness value between the first set of pixels and the second set of pixels.

In accordance with an embodiment, the extracted object-of-interest may be embedded into a new image that provides a new background for the object-of-interest. A blending operation may be applied to the second object boundary of the object-of-interest in the new image for a smooth color-brightness blend to the new background. At least one of a color value or a brightness value of a boundary pixel of the second object boundary may be updated. The update may occur based on a difference between the color value or the brightness value of the boundary pixel and a set of pixels adjacent to the boundary pixel. The set of pixels adjacent to the boundary pixel includes a first number of pixels within the second object mask and a second number of pixels in the new background of the new image.

FIG. 1A is a block diagram that illustrates an exemplary network environment for object boundary stabilization in an image of a sequence of image frames, in accordance with an embodiment of the disclosure. With reference to FIG. 1A, there is shown a network environment 100. The network environment 100 may include an image-processing apparatus 102, sensor circuitry 104, a server 106, and a communication network 108. In accordance with an embodiment, the sensor circuitry 104 may be integrated with the image-processing apparatus 102. In accordance with an embodiment, the sensor circuitry 104 may be an external sensor device communicatively coupled to the image-processing apparatus 102. The sensor circuitry 104 may include a first-type of sensor 104a and a second-type of sensor 104b. The image-processing apparatus 102 and the server 106 may be communicatively coupled to each other, via the communication network 108.

The image-processing apparatus 102 may comprise suitable circuitry, interfaces, and/or code that may be configured to receive a depth map of a scene from the first-type of sensor 104a and a color image of the same scene from the second-type of sensor 104b. The depth map and the color image may be received concurrently for processing. The scene, captured by the first-type of sensor 104a, such as a depth sensor, and the second-type of sensor 104b, may comprise one or more objects. Examples of the one or more objects, may include, but are not limited to a human object, an animal, a moving object, a deforming object, or a non-human or inanimate object, such as a robot, or an articulated object. The articulated object refers to an object that have parts which are attached via joints, and can move with respect to one another. The image-processing apparatus 102 may be configured to utilize both the depth map and the color image to accurately identify and refine a boundary of an object-of-interest. Typical artifacts in the depth map, which are characteristic of the depth sensors, such as the first-type of sensor 104a, may be removed by sequential refinement operations by the image-processing apparatus 102. The image-processing apparatus 102 may be configured to execute the sequential refinement operations to reduce an amount of the object boundary fluctuation for the object-of-interest. The image-processing apparatus 102 may be configured to extract the object-of-interest from the color image based on a refined object mask with a refined object boundary. The extracted object-of-interest may be embedded into a new image that provides a new background for the object-of-interest. Examples of the image-processing apparatus 102 may include, but are not limited to, a digital camera, a camcorder, a head-mounted device (HMD), a surveillance equipment, a smartphone, a smart-glass, a virtual reality-, mixed reality-, or an augmented reality-based device, a computing device, and/or other consumer electronic (CE) devices.

The sensor circuitry 104 may comprise suitable logic, circuitry, interfaces, and/or code that may be configured to concurrently capture the depth map and the color image of a same scene. The sensor circuitry 104 may include the first-type of sensor 104a and the second-type of sensor 104b. The first-type of sensor 104a may include a depth sensor and an infrared (IR) emitter. The depth sensor may be an IR depth sensor. The second-type of sensor 104b may be an image sensor, for example, a RGB camera, which may capture the color image, such as an RGB image. The sensor circuitry 104 may be configured to store the depth map and the color image in a local buffer, a memory, and/or the server 106.

The server 106 may comprise suitable circuitry, interfaces, and/or code that may be configured to store a sequence of image frames and depth maps captured by the image-processing apparatus 102. Examples of the server 106 may include, but are not limited to, a database server, a file server, an application server, a cloud server, a web server, or a combination thereof.

The communication network 108 may include a communication medium through which the image-processing apparatus 102 may be communicatively coupled with the server 106. Examples of the communication network 108 may include, but are not limited to, the Internet, a cloud network, a Wireless Fidelity (Wi-Fi) network, a Local Area Network (LAN), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, including variants and/or a combinations thereof.

In operation, the image-processing apparatus 102 may be configured to receive a depth image of a scene from the first-type of sensor 104a and a color image of the scene from the second-type of sensor 104b. The scene may comprise one or more foreground objects, for example, an object-of-interest that is to be segmented. The image-processing apparatus 102 may be configured to restrict processing of the color image of the scene to a field-of-view (FOV) of the first-type of sensor 104a, as shown, for example, in FIG. 1B.

Figure 1B:
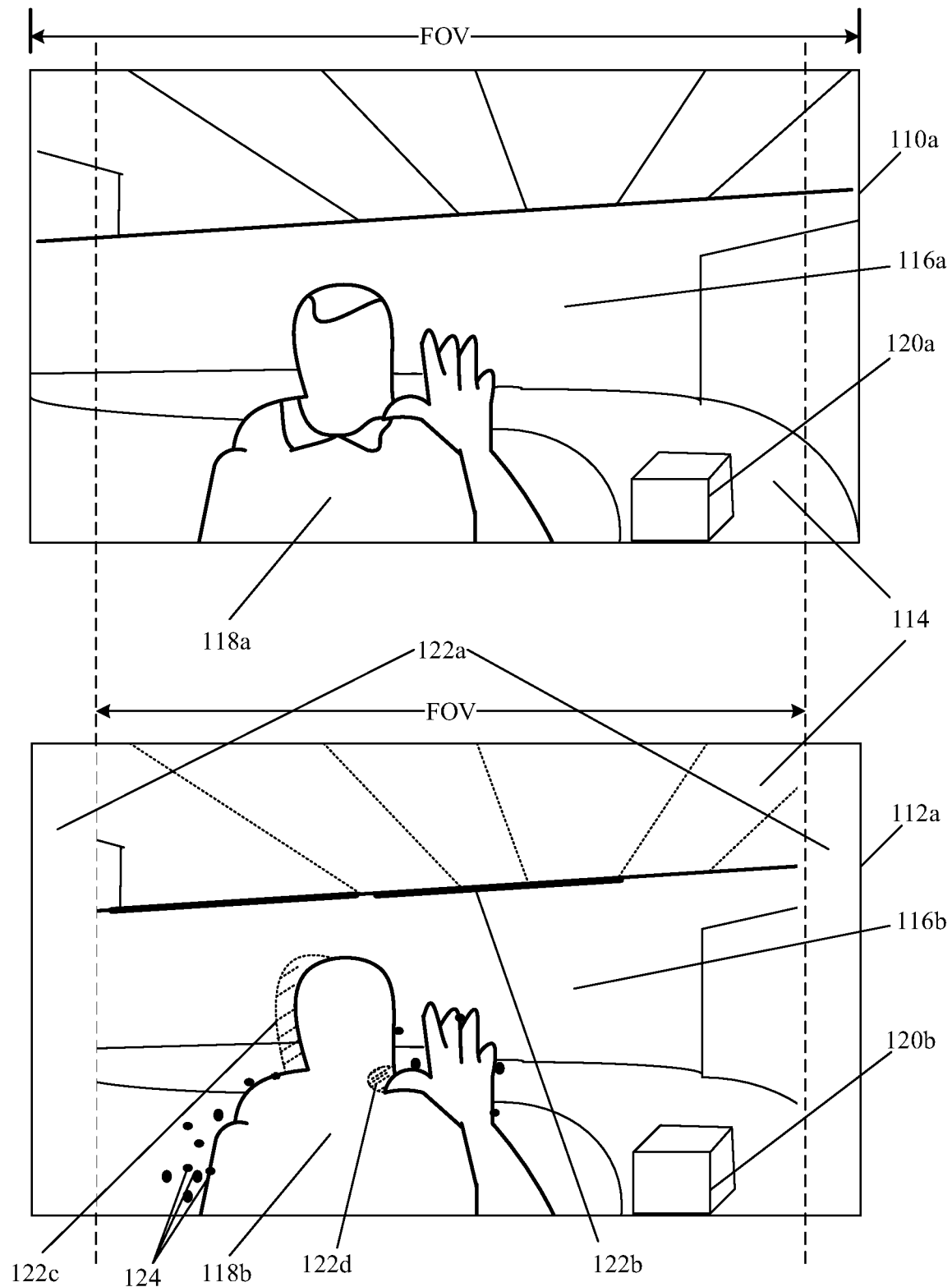
FIG. 1B illustrates an exemplary color image and a depth image of a scene to depict different artifacts in the depth image processed by an exemplary image-processing apparatus, in accordance with an embodiment of the disclosure.

FIG. 1B illustrates an exemplary color image and a depth image of a scene to depict different artifacts in the depth image processed by an exemplary image-processing apparatus, in accordance with an embodiment of the disclosure. With reference to FIG. 1B, there is shown an exemplary color image, such as an RGB image 110a, and an exemplary depth map, such as a depth image 112a, of a scene 114. The RGB image 110a includes a first foreground object 118a, a second foreground object 120a, and a background 116a represented in a RGB color channel. The depth image 112a includes a first depth representation 118b of the first foreground object 118a, a second depth representation 120b of the second foreground object 120a, and a third depth representation 116b of the background 116a. There is also shown certain shadowy areas in the depth image 112a, such as regions 122a, 122b, 122c, 122d, and 124.

The image-processing apparatus 102 may be configured to obtain a first object mask of an object-of-interest, such as the first foreground object 118a, by a depth thresholding operation on the received depth image 112a. The image-processing apparatus 102 may be configured to exclude a plurality of depth values greater than a threshold depth value by the depth thresholding operation. For example, all pixels located less than a certain meter in depth (such as 1.5 depth value) from the sensor circuitry 104 may be considered as belonging to the foreground object(s) and accordingly object mask(s) may be generated. The threshold depth value corresponds to a maximum depth value associated with pixels of the first object mask of the object-of-interest, such as the first foreground object 118a.

In certain scenarios, the depth image 112a may include shadowy areas, for example, as shown in regions 122a, 122b, 122c, and 122d. The IR light emitted by the IR emitters of the first-type of sensor 104a may not propagate to certain areas of the scene 114 that is captured. Such areas where the light does not propagate effectively, usually appears as shadowy areas in the depth image 112a, and have unknown depth values. The unknown depth values may also be referred to as zero-depth or undefined depth values. For example, the region 122a refers to an area of the scene 114 that is outside the FOV of the first-type of sensor 104a. The region 122a may contain zero-depth values as reported by the first-type of sensor 104a. Thus, to resolve the 0-depth artifact in the region 122a, the image-processing apparatus 102 may be configured to restrict processing of the RGB image 110a of the scene 114 to the FOV of the first-type of sensor 104a, as shown by parallel dotted lines, for example, in the FIG. 1B.

The region 122b may refer to an area in the third depth representation 116b (i.e. which corresponds to background 116a) of the depth image 112a, which may also contain zero-depth values. The region 122b may have boundaries with non-zero depth regions, where a difference between the non-zero depth regions nearby the region 122b may be greater than a threshold depth value. Alternatively stated, the region 122b may indicate a large drop in the depth of the scene 114 as compared to nearby non-zero depth regions that share boundary with the region 122b. The region 122c may refer to a shadowy area in the third depth representation 116b of the depth image 112a, which may also contain zero-depth values. The zero-depth values in the region 122c may be as a result of an IR shadow in the region 122c casted by a foreground object, such as the first foreground object 118a, on the background 116a.

In certain scenarios, a portion of a foreground object, such as the first foreground object 118a, may cast a shadow on itself, as shown by the region 122d. Thus, the region 122d may also contain zero-depth values as IR light emitted by the IR emitters of the first-type of sensor 104a may not propagate to the region 122d. The image-processing apparatus 102 may be configured to remove the zero-depth artifacts from the depth image 112a. The zero-depth artifacts correspond to the areas with unknown depth values, for example, the regions 122a, 122b, 122c, and 122d, in the depth image 112a. The image-processing apparatus 102 may be configured to classify pixels associated with the unknown depth values as background pixels or foreground pixels based on specified criteria. The classification of pixels may be done to obtain a correct object mask, such as the first object mask, of the object-of-interest. The classification of pixels and the specified criteria are described in detail, for example, in FIG. 3A to 3I.

In accordance with an embodiment, the image-processing apparatus 102 may be configured to remove dangling-pixels artifact present on a first object boundary of the first object mask. The "dangling" or dangling-pixels artifact may be manifested by significant fluctuations at the first object boundary adjacent to the IR shadow areas in the depth image 112a. In those IR shadow areas, such as the region 124, at the first object boundary, the object boundary fluctuation may occur from frame-to-frame and from pixel-to-pixel manner. The region 124 indicates a chaotic depth in the depth image 112a (as reported by the first-type of sensor 104a), which results in the dangling-pixels artifact at and around the first object boundary of the object-of-interest, such as the first foreground object 118a. An example of the dangling-pixels artifact is further shown and described in FIGS. 3A and 3C. The image-processing apparatus 102 may be configured to mark a pixel as a dangling-pixel when the pixel in a 3×3 pixels vicinity has at least one depth-undefined pixel (for example, a pixel that contain a zero-depth value).

In accordance with an embodiment, the image-processing apparatus 102 may be configured to smoothen the first object boundary of the first object mask using a moving-template filter on the RGB image 110a after removal of the zero-depth artifacts and the dangling-pixels artifact. The smoothening operations are described in detail in the FIGS. 3A, 3E, 3F, 3G, 3H, and 3I. The image-processing apparatus 102 may be configured to generate a second object mask having a second object boundary based on the smoothening of the first object boundary. The image-processing apparatus 102 may be configured to extract the object-of-interest from the RGB image 110a based on the generated second object mask having the second object boundary. The image-processing apparatus 102 may be configured to embed the extracted object-of-interest into a new image that provides a new background for the object-of-interest. The image-processing apparatus 102 may be configured to apply a blending operation to the second object boundary of the object-of-interest in the new image for a smooth color-brightness blend to the new background. The blending operation is described in detail, for example, in FIGS. 3A and 3M.

In accordance with an embodiment, the object-of-interest may be extracted from each source color image, such as the RGB image 110a, of a sequence of image frames, and blended in each new image frame of a video frame-by-frame in real time or near real time. The image-processing apparatus 102 may be further configured to communicate the video that includes the embedded object-of-interest and the substituted background in the new image frame and the subsequent image frames to the server 106, via communication network 108. The server 106 may be configured to store the modified video.

The disclosed image-processing apparatus 102 for object boundary stabilization in an image of a sequence of image frames, such as a movie or other video, may be implemented in various application areas, such as video surveillance, automatic video editing systems, automatic background substitution systems, or tracking of objects that change position or orientations at different time instances while an input sequence of image frames is captured. The disclosed image-processing apparatus 102 and method may be suited for a real-world tracking application, such as video surveillance of human beings or other articulated objects, object tracking in a gaming system, or other real time or near-real time object segmentation and blending of objects in a new background.

Figure 2:
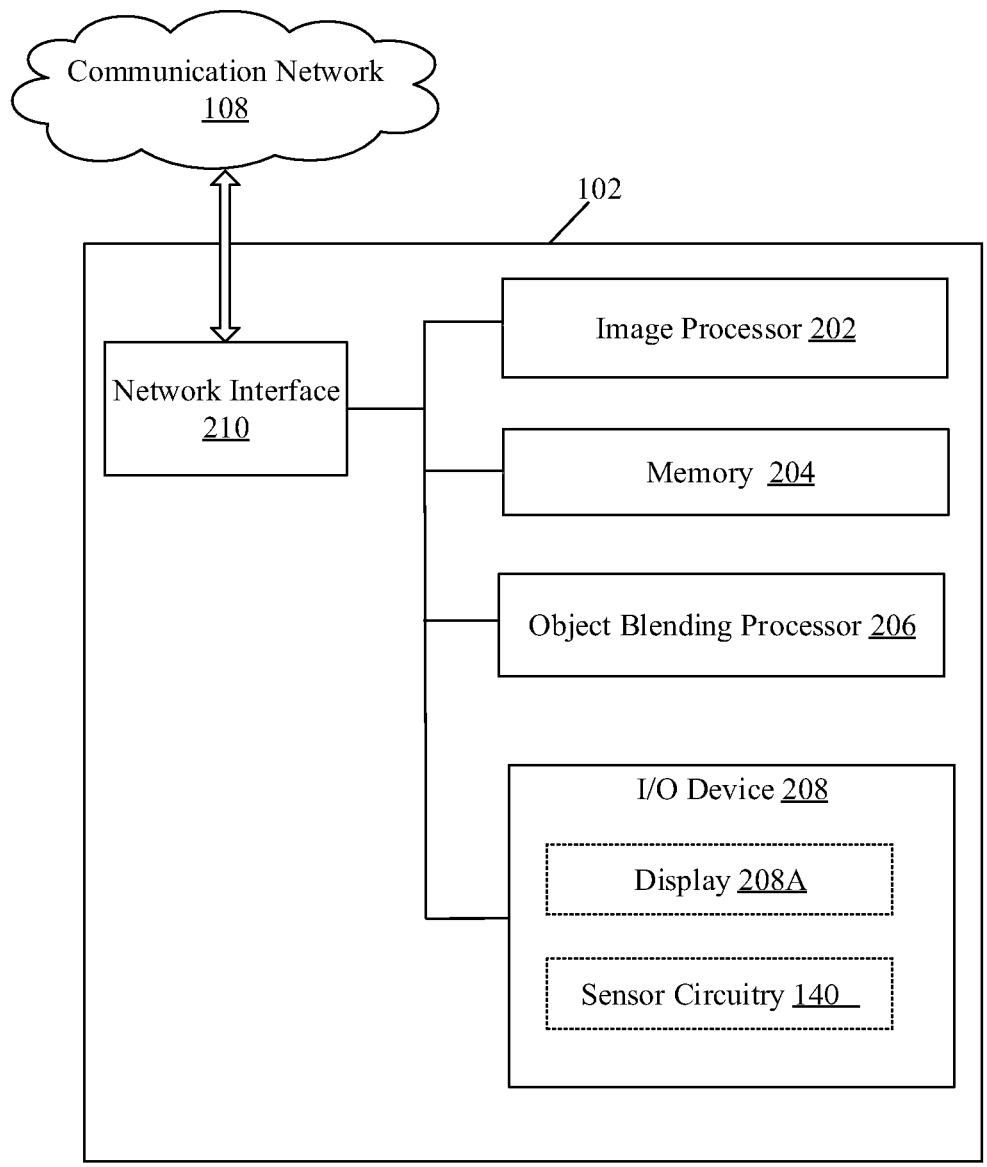
FIG. 2 is a block diagram that illustrates an exemplary image-processing apparatus, in accordance with an embodiment of the disclosure.

FIG. 2 is a block diagram that illustrates an exemplary image-processing apparatus, in accordance with an embodiment of the disclosure. FIG. 2 is explained in conjunction with elements from FIGS. 1A and 1B. With reference to FIG. 2, there is shown the image-processing apparatus 102. The image-processing apparatus 102 may include one or more circuits, such as an image processor 202, a memory 204, and an object blending processor 206, an I/O device 208, and a network interface 210. The I/O device 208 may include the sensor circuitry 104 and a display 208A. The sensor circuitry 104 is shown as an integrated unit of the image-processing apparatus 102, in an example. The image processor 202 may be communicatively coupled with the memory 204, the object blending processor 206, the I/O device 208, the network interface 210, and the sensor circuitry 104. The network interface 210 may facilitate communication with the server 106, via communication network 108.

The image processor 202 may comprise suitable logic, circuitry, interfaces, and/or code that may be configured to smoothen the first object boundary of the first object mask using a moving-template filter on the received color image after removal of different types of artifacts, such as zero-depth and dangling-pixels artifacts. The image processor 202 may be configured to generate a second object mask having a second object boundary based on the smoothening of the first object boundary. Thereafter, the object-of-interest may be extracted from the color image based on the generated second object mask having the second object boundary, which is the refined object boundary. The image processor 202 may be configured to execute a set of instructions stored in the memory 204. The image processor 202 may be implemented based on a number of processor technologies known in the art. Examples of the image processor 202 may be a Reduced Instruction Set Computing (RISC) processor, an Application-Specific Integrated Circuit (ASIC) processor, a Complex Instruction Set Computing (CISC), a hardware processor, a central processing unit (CPU), and/or other processors or control circuits.

The memory 204 may comprise suitable logic, circuitry, and/or interfaces that may be configured to store the depth map and the color image in a local image buffer of the memory 204. The memory 204 may also store a set of instructions executable by the image processor 202. The memory 204 may be configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The object blending processor 206 may comprise suitable logic, circuitry, interfaces, and/or code that may be configured to apply a blending operation to the second object boundary of the object-of-interest in the new image for a smooth color-brightness blend to the new background. The object blending processor 206 may be implemented as a separate processor (such as a coprocessor), or circuitry in the image-processing apparatus 102. The object blending processor 206 and the image processor 202 may be implemented as an integrated processor or a cluster of processors that perform the functions for the object blending processor 206 and the image processor 202.

The I/O device 208 may comprise suitable logic, circuitry, interfaces, and/or code that may be configured to receive an input and provide an output to a user. The I/O device 208 may comprise various input and output devices that may be configured to communicate with the image processor 202. Examples of the input devices may include, but not limited to, a touch screen, a keyboard, a mouse, a joystick, a microphone, and/or the sensor circuitry 104. Examples of the output devices may include, but not limited to, the display 208A and/or a speaker.

The display 208A may comprise suitable logic, circuitry, interfaces, and/or code that may be configured to render the extracted object-of-interest. In accordance with an embodiment, the display 208A may be able to receive input from a user. In such a scenario, the display 208A may be a touch screen that enables the user to provide input. The touch screen may correspond to at least one of a resistive touch screen, a capacitive touch screen, or a thermal touch screen. In accordance with an embodiment, the display 208A may receive the input through a virtual keypad, a stylus, a gesture-based input, and/or a touch-based input. The display 208A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display 208A may refer to a display screen of smart-glass device, a see-through display, a projection-based display, an electro-chromic display, a cut-to-shape display, and/or a transparent display. The see-through display may be a transparent or a semi-transparent display. In accordance with an embodiment, the see-through display and/or the projection-based display may generate an optical illusion that the extracted object-of-interest with a transparent background is floating in air at a pre-determined distance from a user's eye, such as the user, thereby providing an enhanced user experience.

The network interface 210 may comprise suitable logic, circuitry, interfaces, and/or code that may be configured to facilitate communication between the image-processing apparatus 102 and the server 106, via the communication network 108. The network interface 210 may be implemented by use of various known technologies to support wired or wireless communication of the image-processing apparatus 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions and/or operations performed by the image-processing apparatus 102, as described in FIGS. 1A and 1B, may be performed by the image processor 202 and/or the object blending processor 206. Other operations performed by the image processor 202 and the object blending processor 206 are further described, for example, in the FIGS. 3A to 3M, 4A, and 4B.

Figure 3A:
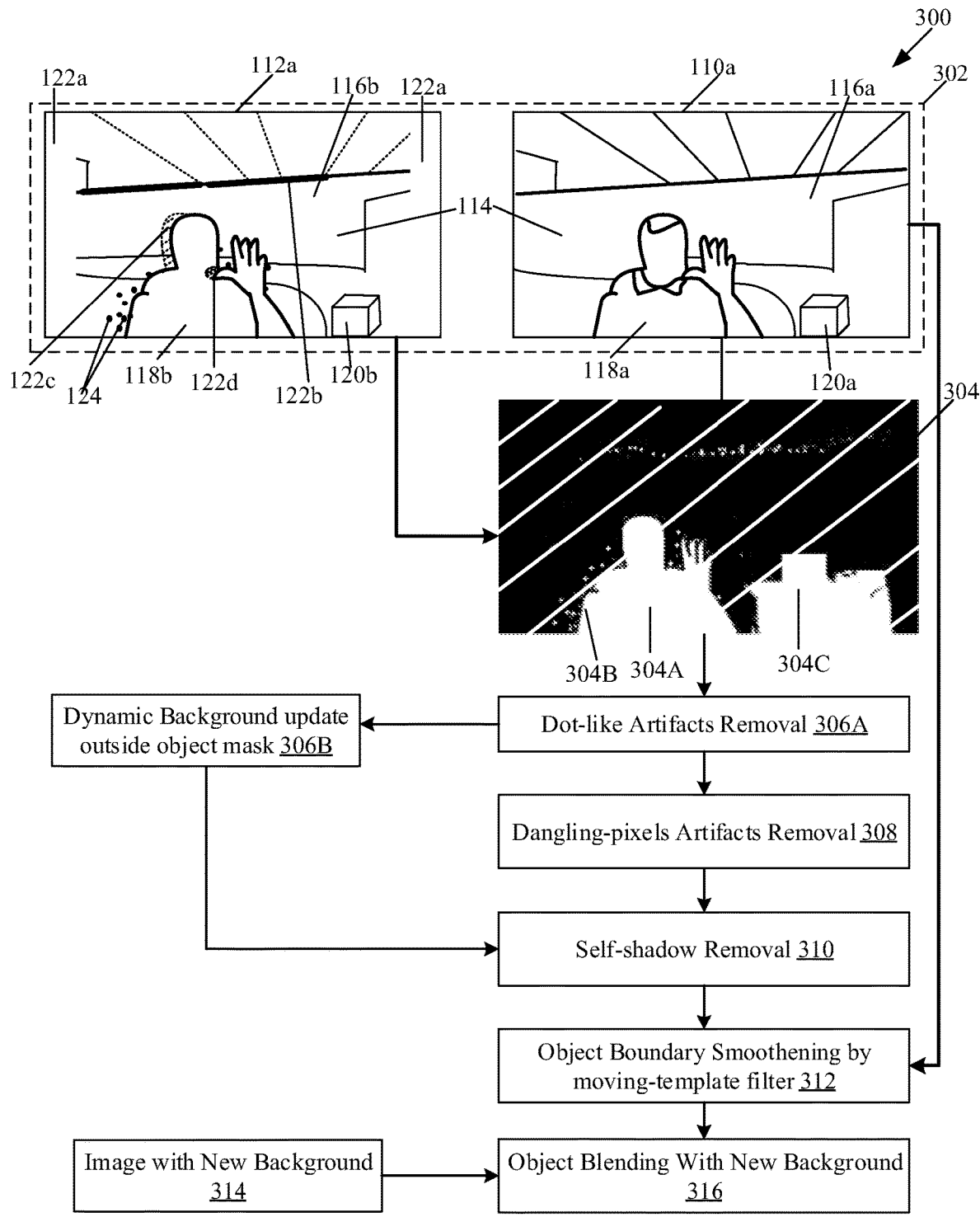
FIGS. 3A to 3M, collectively, illustrate exemplary operations of the image-processing apparatus of FIG. 2 for object boundary stabilization in an image of a sequence of image frames, in accordance with an embodiment of the disclosure.
Figure 3B:
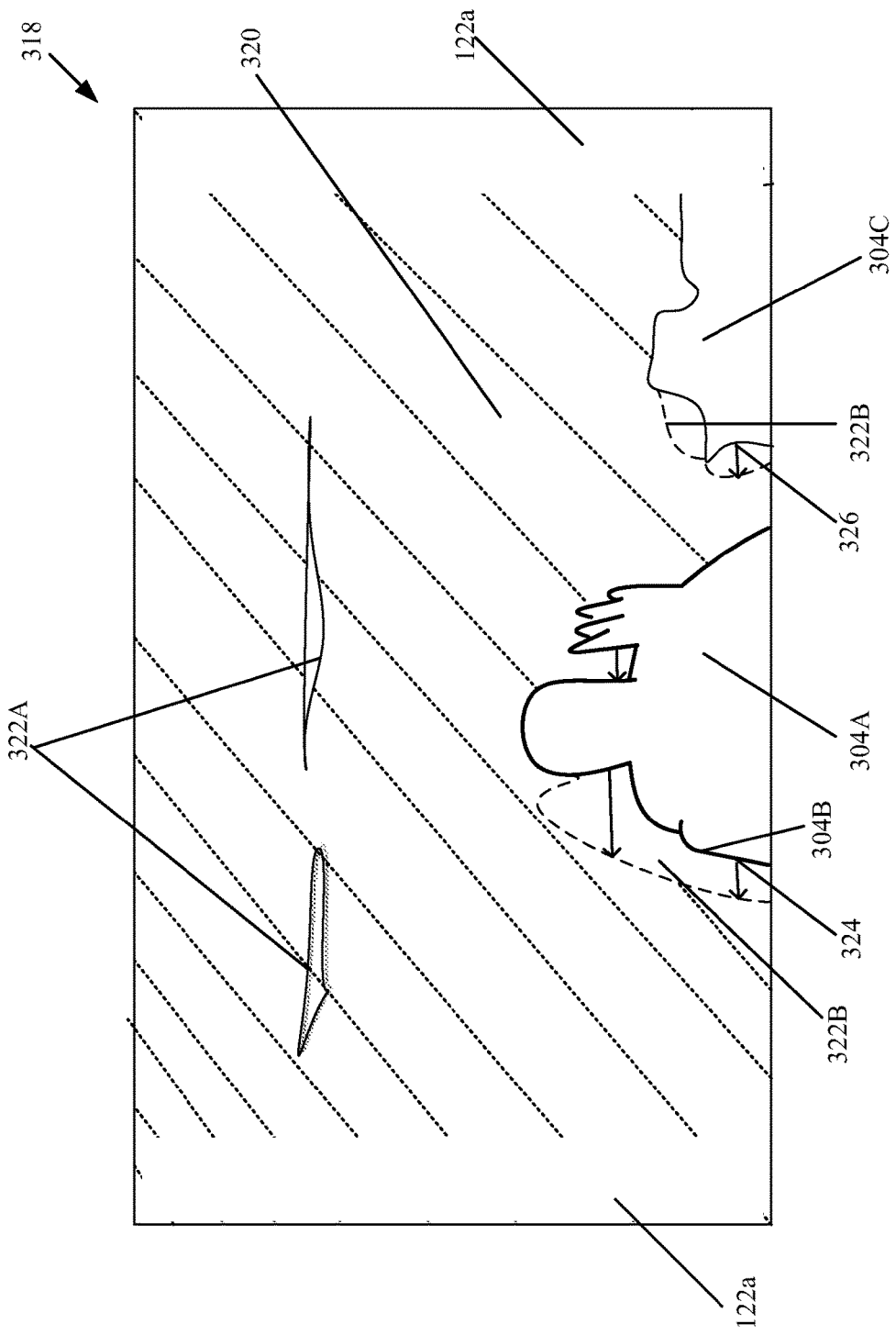
Figure 3C:
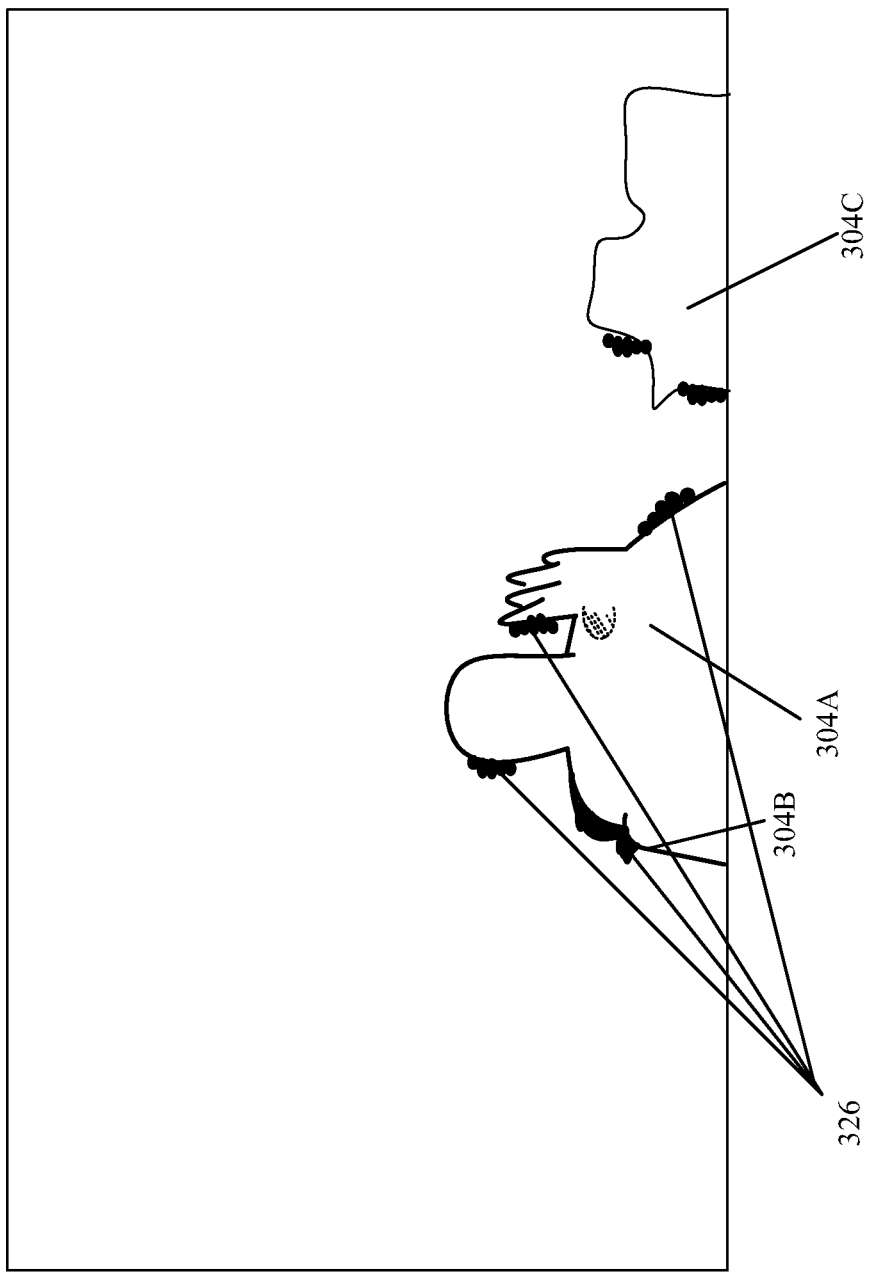

FIGS. 3A to 3M, collectively, illustrate exemplary operations of the image-processing apparatus of FIG. 2 for object boundary stabilization in an image of a sequence of image frames, in accordance with an embodiment of the disclosure. FIGS. 3A to 3M are described in conjunction with elements from FIGS. 1A, 1B, and 2. With reference to FIG. 3A, there is shown an exemplary processing pipeline 300 of an object mask refinement and object blending into a new background, in accordance with an embodiment of the disclosure.

At 302, the image processor 202 may be configured to receive the depth image 112a of the scene 114 from the first-type of sensor 104a and the RGB image 110a of the scene 114 from the second-type of sensor 104b. At 304, the image processor 202 may be configured to obtain a first object mask 304A having a first object boundary 304B of an object-of-interest, such as the first foreground object 118a, by a depth thresholding operation on the received depth image 112a. The objects that lie near to the first-type of sensor 104a in the scene 114 may have smaller depth as compared to objects that lie far away from the first-type of sensor 104a. In certain cases, an additional mask 304C may also be obtained, if an object, such as the second foreground object 120a, lie in similar depth in the scene 114 as the first foreground object 118a in the depth thresholding operation. Such additional mask 304C may be discarded latter. The image processor 202 may be configured to estimate a maximum depth value of the object-of-interest, such as the first foreground object 118a. Thereafter, by the depth thresholding operation, the image processor 202 may be configured to exclude all depth values that are greater than a threshold depth value. The threshold depth value may be dynamically computed based on the estimated maximum depth value associated with pixels of the object-of-interest, such as the first foreground object 118a. The depth information as received from modern depth sensors, such as the first-type of sensor 104a, are usually imperfect, and thus the depth image 112a contain shadowy areas, such as the regions 122a to 122d, and the region 124, as observed and discussed in FIG. 1B. The imperfectness in depth map, such as the depth image 112a, may result in significant fluctuations on a boundary, such as the first object boundary 304B, of an object, especially visible between frames of a sequence of image frames. Thus, if an object is directly segmented based on the obtained object mask based on conventional depth-based segmentation methods, it may provide unpleasant artifact for a viewer. Thus, the image processor 202 executes a series of refinement operations to reduce an amount of fluctuation on the first object boundary 304B. The first object mask 304A having the first object boundary 304B may be suitably refined by the image processor 202.

At 306A, the image processor 202 may be configured to remove dot-like artifacts on and around the first object mask 304A. The dot-like artifacts correspond to the zero-depth artifacts. The removal of the zero-depth artifacts on and around the first object mask 304A, may be understood in detail, for example, from FIG. 3B. Now referring to FIG. 3B, a zero-depth classification map 318 is shown to describe removal of zero-depth (or dot-like) artifacts on and around the first object mask 304A. The zero-depth classification map 318 includes the first object mask 304A, the additional mask 304C, and a background region 320 (represented by dotted-line patterns). The background region 320 may be black or monochromatic and includes regions 322A and 322B. The regions 322A and 322B corresponds to processed regions, where the zero-depth artifacts are processed and updated to non-zero-depth pixels.

The image processor 202 may be configured to find one or more zero-depth connected areas (such as the region 122b as shown in the FIG. 1B and FIG. 3A; not shown in FIG. 3B), in the depth image 112a that have boundaries with non-zero depth regions. The region 122b may indicate a large drop in the depth of the scene 114 as compared to nearby non-zero depth regions that share boundary with the region 122b. In certain cases, the majority of boundary pixels, i.e., pixels that share boundary with the region 122b, may contain a depth value greater than the maximum depth of foreground objects, such as the first foreground object 118a. In such cases, the image processor 202 may be configured to classify the one or more zero-depth connected areas, such as the region 122b, with non-zero depth values in a first refinement operation. The classified depth values may be similar to the depth values of the boundary pixels (i.e., pixels that share boundary with the region 122b). The pixels for which the depth values are then classified to non-zero depth values in the one or more zero-depth connected areas are represented, for example, by the regions 322A in the zero-depth classification map 318 in the FIG. 3B. In accordance with an embodiment, the image processor 202 may be configured to in-paint the regions 322A in a color, for example, cyan, different from the background region 320 in the zero-depth classification map 318. Thus, the zero-depth artifacts from the region 122b (which indicate a large drop in the depth of the scene 114 (FIG. 1B)) are removed in the first refinement operation.

In accordance with an embodiment, the image processor 202 may be configured to classify all pixels of the first object mask 304A including the first object boundary 304B, and the additional mask 304C as foreground pixels. Such foreground pixels may be marked in different color, for example, red in the zero-depth classification map 318. Such foreground pixels may contain depth less than the threshold depth value used for depth thresholding operation. For example, all pixels located less than 1.5 meter in depth (i.e. 1.5 depth value) from the sensor circuitry 104 may be considered as belonging to the foreground object(s) and marked in different color, for example, red in the zero-depth classification map 318. Thereafter, starting from, for example, the left-most pixel (a boundary pixel) of the foreground object(s), such as the first foreground object 118a and the second foreground object 120a, the image processor 202 may be configured to check next pixels in a row in a certain direction (i.e. row-wise from the boundary pixel of the foreground object(s) towards the background region 320) until a non-zero depth pixel is met. For example, starting from the left-most boundary pixel of the first object boundary 304B of the first object mask 304A, the image processor 202 may be configured to check subsequent pixels in a row towards left-direction, as shown by an arrow mark 324, until a non-zero depth pixel is met. In cases where the pixel has a depth value greater than the maximum depth value of the first foreground object 118a, then all the checked pixels that have non-zero depth value are classified as background pixels. A similar check, as shown by an arrow mark 326, and classification of pixels that have non-zero depth value may be executed from the boundary pixels of the additional mask 304C. Thus, the regions 322B that previously contain non-zero depth artifacts or dot-like artifacts may be removed based on the classification. The regions 322B may correspond to the regions 122c and 124 in the depth image 112a (FIGS. 1B and 3A), where classification of pixels is updated. The regions 322B may be represented by a unique color, for example green, in the zero-depth classification map 318.

Now returning to FIG. 3A, at 306B, the image processor 202 may be configured to dynamically update the background 116a outside the first object mask 304A in the RGB image 110a. The knowledge that some pixels in the background 116a with zero-depth values actually belong to a background region, may be utilized for the dynamic update of the background 116a of the RGB image 110a, thus eliminating certain blind spots or dot-like artifacts in the background 116a. Alternatively stated, the updated background 116a may be an RGB background image devoid of the foreground objects, such as the first foreground object 118a and the second foreground object 120a, and the blind spots or the dot-like artifacts).

At 308, the image processor 202 may be configured to remove dangling-pixels artifact present on the first object boundary 304B of the first object mask 304A. After removal of the dot-like artifacts or certain zero-depth artifacts around the first object mask 304A, the dangling-pixels artifact present on the first object boundary 304B of the first object mask 304A, may be removed. The removal of dangling-pixels artifact may be further understood from FIG. 3C. Now referring to FIG. 3C, a dangling-pixels artifact 326 is shown in an example. The dangling-pixels artifact 326 may be manifested by significant fluctuations at the first object boundary 304B adjacent to the IR shadow areas in the depth image 112a. In those IR shadow areas, such as the region 124 (FIGS. 1B, and 3A), at the first object boundary 304B, the object boundary fluctuation may occur from frame-to-frame and from pixel-to-pixel manner. The dangling-pixels artifact 326 are caused due to the chaotic depth, as shown in region 124 (FIGS. 1B, and 3A), in the depth image 112a. The image processor 202 may be configured to tag a pixel as a dangling-pixel at the first object boundary 304B when the pixel in a "3×3" pixels vicinity has at least one depth-undefined pixel (for example, a pixel that contain a zero-depth value). Once the dangling-pixels artifact 326 are identified and tagged, the dangling-pixels artifact 326 may be removed.

Now returning to FIG. 3A, at 310, the image processor 202 may be configured to remove self-shadow from the first object mask 304A. The removal of self-shadow from the first object mask 304A, may be further understood from the FIG. 3D. Now referring to FIG. 3D, a self-shadow region 328 is shown in the first object mask 304A. In certain scenarios, a portion of a foreground object, such as the first foreground object 118a, may cast a shadow on itself, referred to as the self-shadow. The self-shadow region 328 corresponds to the region 122d (FIGS. 1B and 3A). Thus, the pixels in the self-shadow region 328 may also contain zero-depth values as IR light emitted by the IR emitters of the first-type of sensor 104a may not propagate to certain areas resulting in the self-shadow region 328 in the first object mask 304A. After the removal of zero-depth artifacts outside the first object mask 304A and the dynamic update of background 116a outside the first object mask 304A in the RGB image 110a, the image processor 202 may be configured to process pixels within the first object mask 304A. In cases where a pixel has a zero-depth value in the first object mask 304A of the first foreground object 118a, then all the processed pixels with zero-depth value within the first object mask 304A may be classified as foreground pixels.

Now again returning to FIG. 3A, at 312, the image processor 202 may be configured to smoothen the first object boundary 304B of the first object mask 304A using a moving-template filter on the RGB image 110a. The smoothening of the first object boundary 304B using the moving-template filter may be understood in details, for example, from FIGS. 3E, 3F, 3G, 3H, and 3I. Now referring to FIG. 3E, there is shown a moving-template filter 330, a normal 330A (indicated by arrow mark), an exterior band 332, an interior band 334, and a boundary pixels band 336, and an anchor pixel 336a of the boundary pixels band 336. The image processor 202 may be configured to define an initial object boundary of the object-of-interest, such as the first foreground object 118a. A segmentation algorithm stored in the memory 204 may be used to define the initial object boundary, such as the first object boundary 304B, after the removal of all artifacts, such as the zero-depth artifacts, the dangling-pixels artifact 326, and the self-shadow. The pixel coordinates of the boundary pixels are obtained by the image processor 202.

The moving-template filter 330 may be a template-based moving-window that moves along the boundary pixels band 336. In accordance with an embodiment, the template shape of the moving-template filter 330 may be circular. In some embodiments, the shape of the template may be oval or polygonal, without limiting the scope of the disclosure. The exterior band 332 (represented by dotted pattern) are a group of nearby pixels outside the first object boundary 304B of the first object mask 304A, as shown in an example. The interior band 334 (represented by angular line pattern) are a group of nearby pixels within the first object boundary 304B of the first object mask 304A, as shown in an example. The boundary pixels band 336 includes boundary pixels of the first object boundary 304B of the first object mask 304A. The boundary pixels band 336 is represented by white pixels between the exterior band 332 and the interior band 334.

In accordance with an embodiment, the moving-template filter 330 may be positioned on the RGB image 110a to encompass a boundary pixel, such as the anchor pixel 336a, of the first object boundary 304B such that the moving-template filter may include a first set of pixels located in an interior region (such as the interior band 334) of the first object mask 304A and a second set of pixels located in an exterior region (such as in the exterior band 332) outside the first object mask 304A. Alternatively stated, the pixels within the moving-template filter 330 forms two subsets on either side of boundary pixels, the first set of pixels (interior pixels), and the second set of pixels (exterior pixels). The exact division into the first set of pixels and the second set of pixels may occur when moving-template filter 330 is centered on the boundary pixel (i.e. the anchor pixel 336a). A normal 330A (represented by an arrow) to the first object boundary 304B may define a direction of search for the best location of the moving-template filter 330.

In accordance with an embodiment, the image processor 202 may be configured to apply the moving-template filter 330 sequentially to the pixels along the normal 330A passing through the anchor pixel 336a. The image processor 202 may be configured to compute a difference in a color value and a brightness value between the first set of pixels and the second set of pixels within the moving-template filter 330. In other words, at each location of the moving-template filter 330 when it moves along the boundary pixels, a difference in color-brightness between the first set of pixels and the second set of pixels, may be computed. A location of the moving-template filter 330 along the normal 330A, which provides a maximum difference in the color-brightness may be a candidate for the refinement of the first object boundary 304B. In other words, the image processor 202 may be configured to identify a boundary pixel as a candidate pixel for the smoothening of the first object boundary 304B based on the computed difference in the color value and the brightness value between the first set of pixels and the second set of pixels. There are many advantages of the moving-template filter 330 that acts as a flexible and a directional filter. For example, the geometry of the moving-template filter 330 may be adjusted to a local geometry of object's boundary, such as the first object boundary 304B. Further, the smoothening by the moving-template filter 330 is invariant to the non-local brightness transformation. Further, the smoothening by the moving-template filter 330 is very fast having a simplified complexity of the number of boundary pixels multiplied by the search length and the total number of pixels in the moving-template filter 330.

Figure 3D:
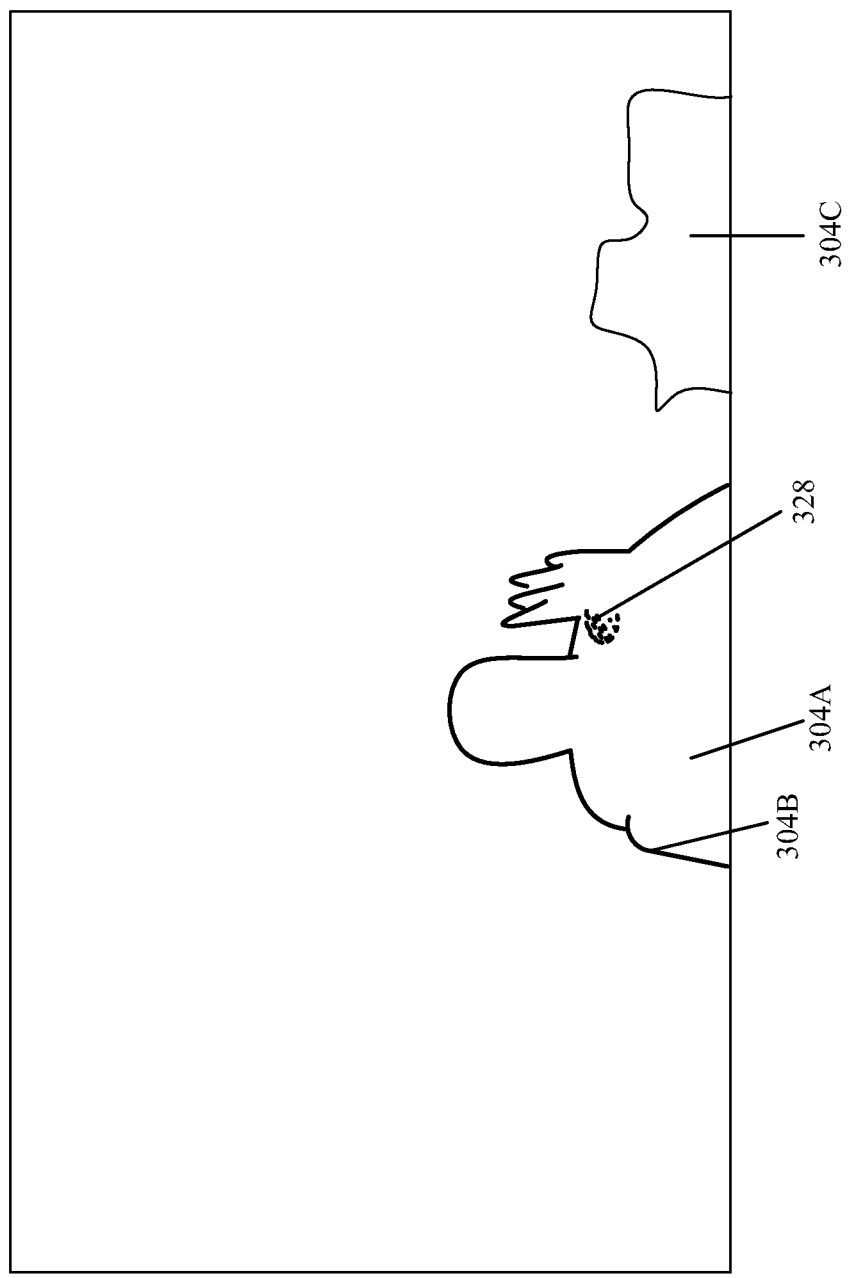
Figure 3E:
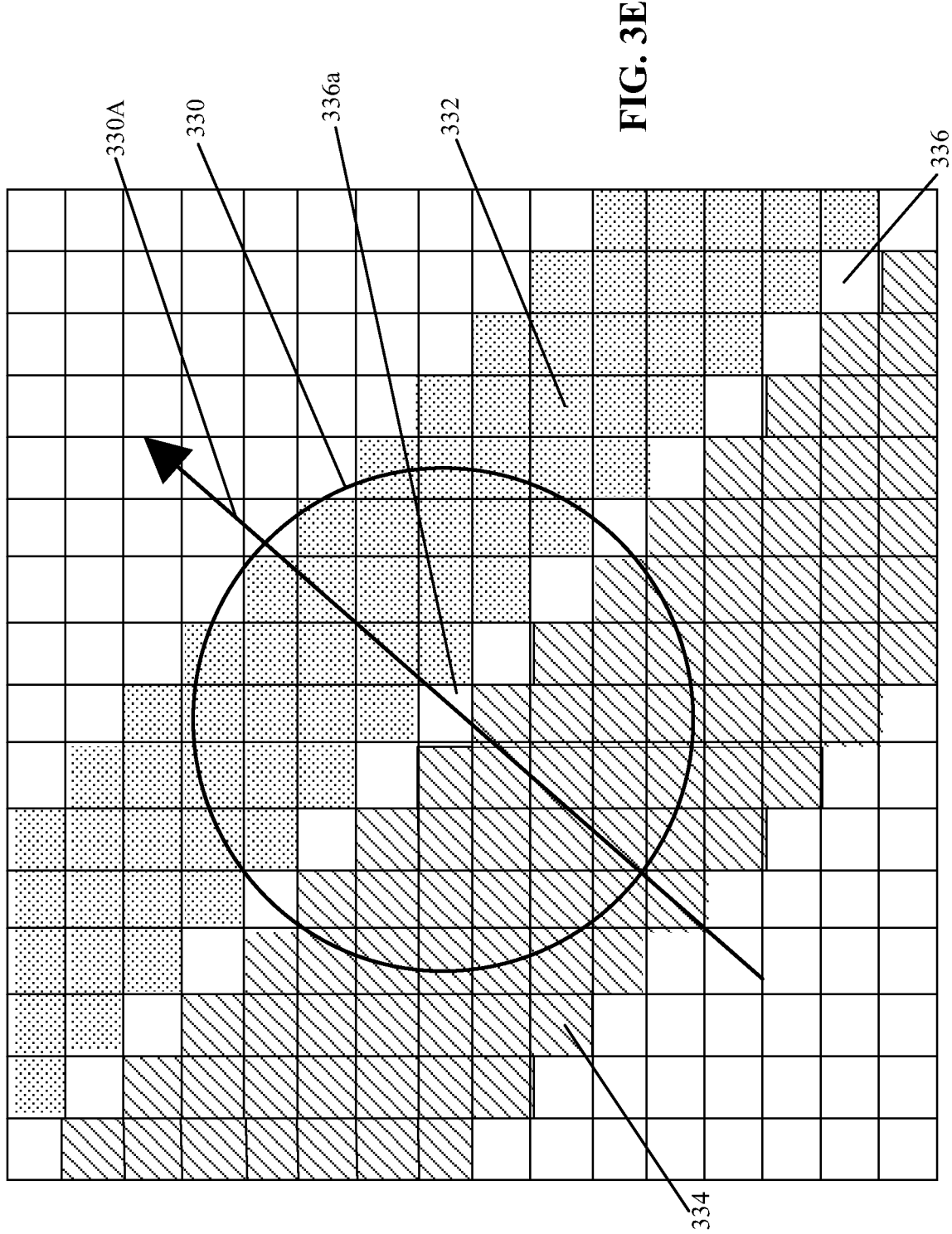
Figure 3F:
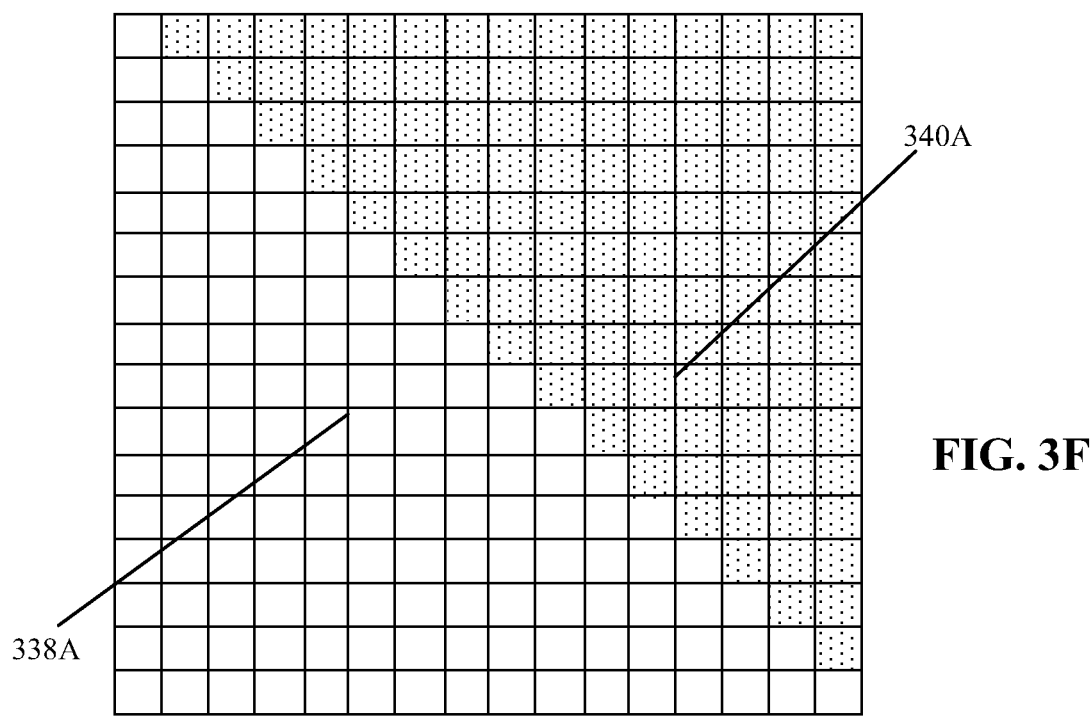
Figure 3G:
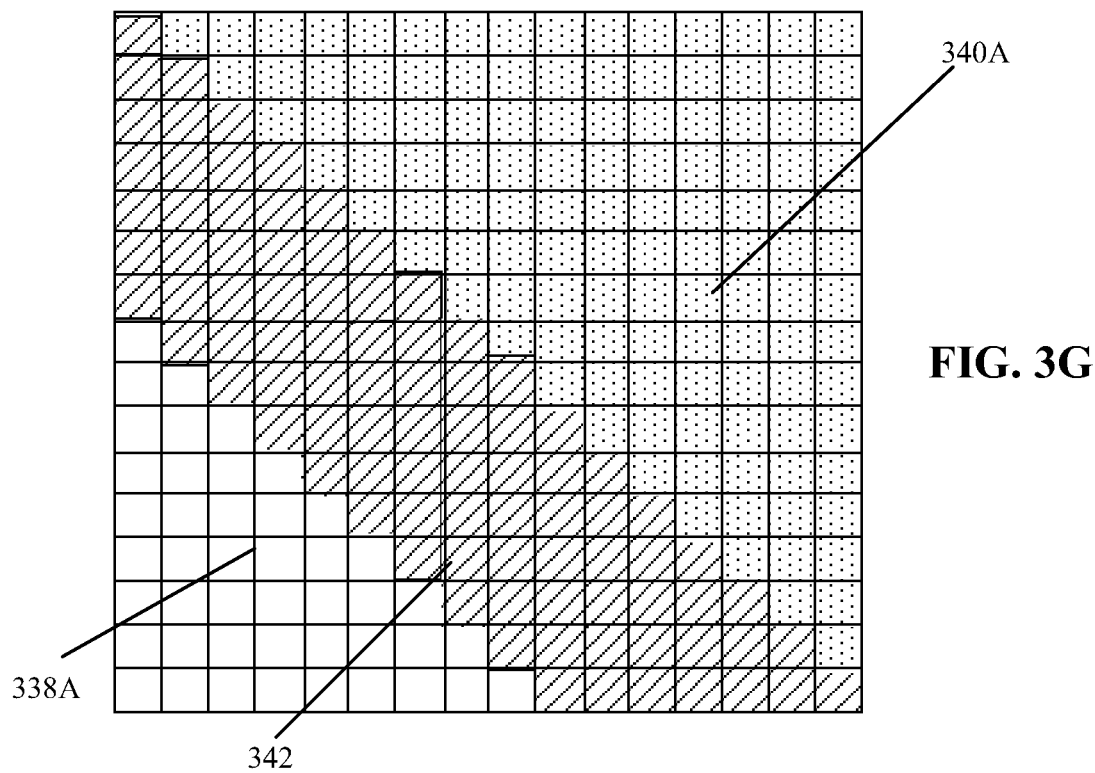
Figure 3H:
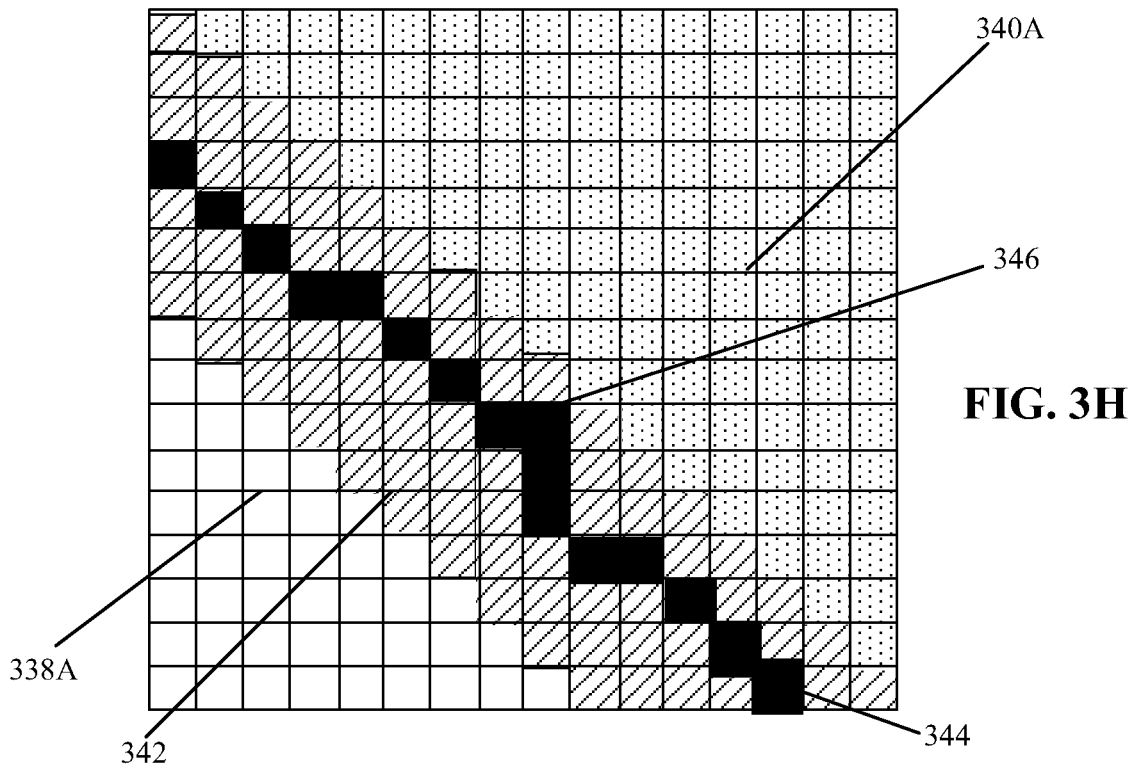
Figure 3I:
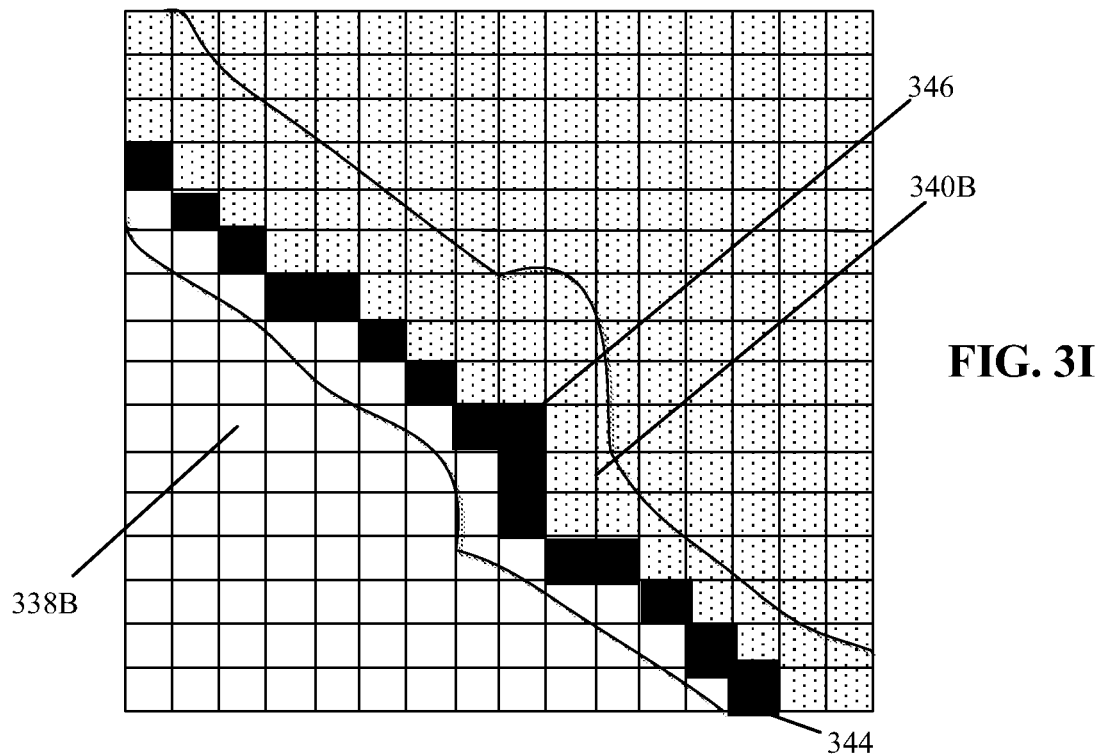

With reference to FIGS. 3F to 3I, there is shown an exemplary adjustment of the first object mask 304A, where the adjustment may be within the object mask, such as the first object mask 304A. Now referring to FIG. 3F, there is shown an initial object mask 338A (represented by white pixels) and an initial background 340A (represented by dotted pixels). The initial object mask 338A corresponds to the first object mask 304A. The initial background 340A corresponds to the background 116a. With reference to FIG. 3G, there is further shown a band 342 (represented by line pattern) to adjust the initial object mask 338A. The band 342 may correspond to the interior band 334 (FIG. 3E). With reference to FIG. 3H, there is further shown an adjusted object boundary 344 within the band 342. The image processor 202 may be configured to find pixels with a maximum image gradient along the normal 330A (of FIG. 3E) to the initial object boundary of the initial object mask 338A (such as the first object boundary 304B of the first object mask 304A) within the moving-template filter 330. The normal 330A (of FIG. 3E) to the initial object boundary define a direction in which the image gradients are computed. Certain pixels, such as a pixel 346, with the maximum image gradient along the normal 330A define the adjusted object boundary 344. With reference to FIG. 3I, there is shown an adjusted background 340B, an adjusted object mask 338B, the adjusted object boundary 344, and the pixel 346 with maximum image gradient. The adjusted object mask 338B corresponds to a second object mask and the adjusted object boundary 344 corresponds to a second object boundary of the second object mask. In some embodiments, the fluctuation of objects boundaries between frames may be significantly reduced by applying moving averaging (such as by use of the moving-template filter 330) to the object's boundaries, such as the first object boundary 304B. The optimal length of the moving-template filter 330 may depend on the size of the color image. For example, for high definition (HD) images, the optimal length of the moving-template filter 330 may be about 21 pixels.

Figure 3J:
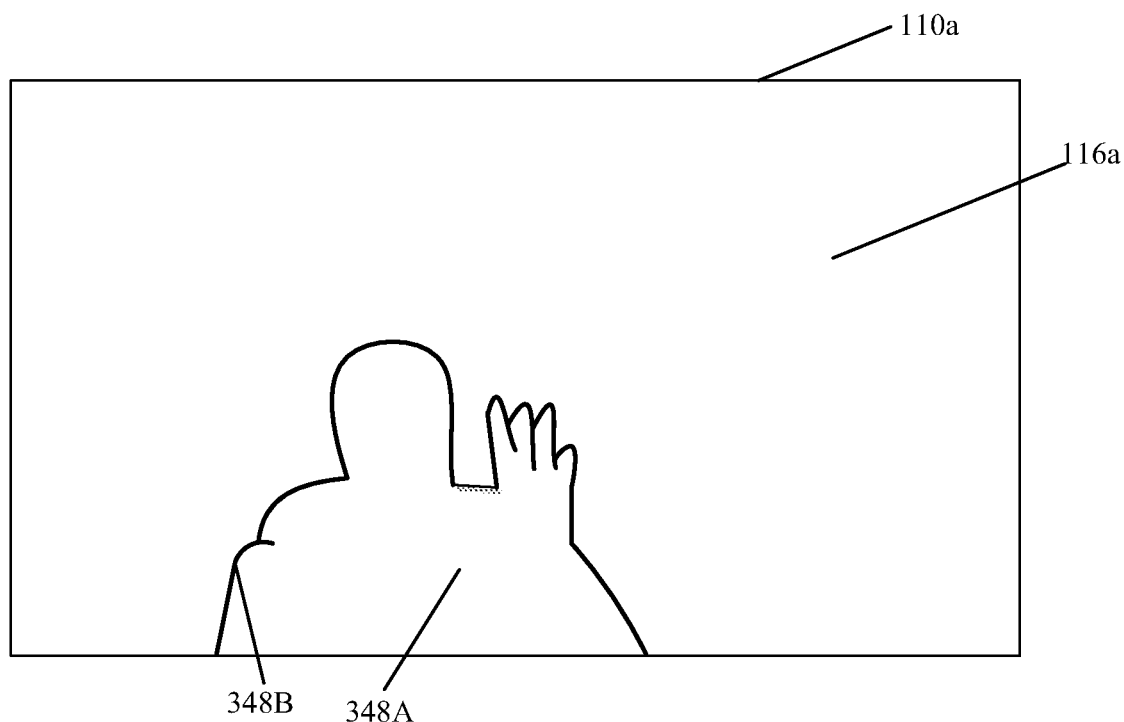

Now referring to FIG. 3J, there is shown a second object mask 348A with a second object boundary 348B. The location of the second object mask 348A corresponds to the current location of the first foreground object 118a. The image processor 202 may be configured to generate the second object mask 348A having the second object boundary 348B based on the smoothening of the first object boundary 304B. Thus, the image processor 202 executes a series of refinement operations (for example, the operations 306A, 306B, 308, 310, and 312 as shown in the processing pipeline 300 of FIG. 3A, and the FIGS. 3B to 3I) for the object boundary stabilization and reduction in the amount of fluctuation on the initial object boundary, such as the first object boundary 304B.

Figure 3K:
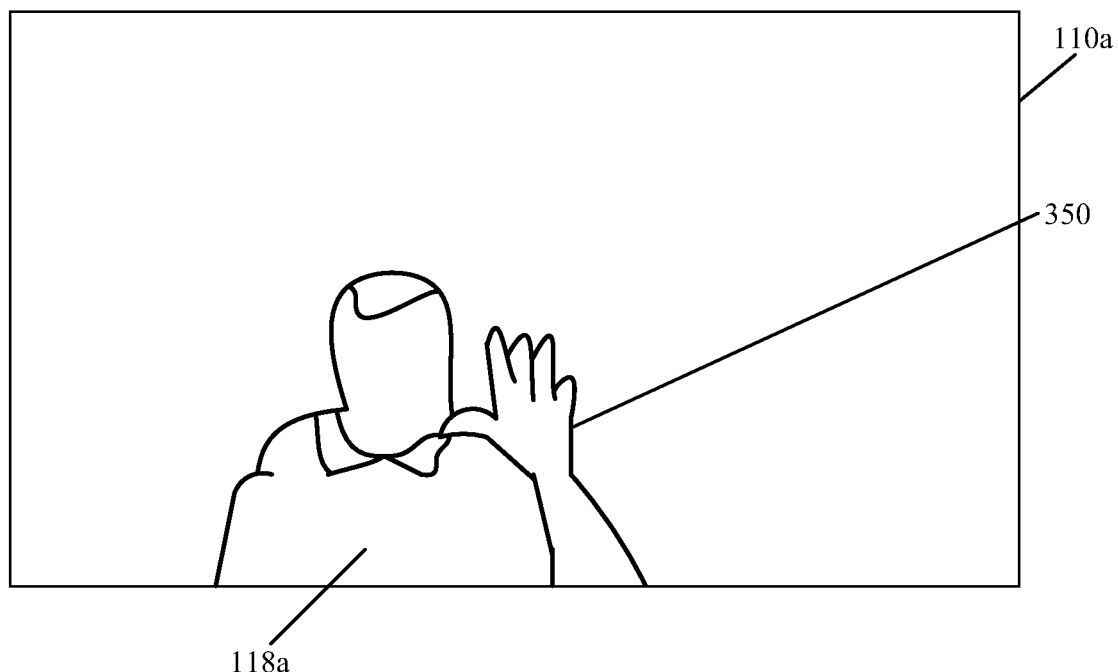

With reference to FIG. 3K, there is shown an exemplary final segmentation result 350, such as the first foreground object 118a delineated from the background 116a of the RGB image 110a. The image processor 202 may be configured to extract the object-of-interest, such as the first foreground object 118a, from the RGB image 110a based on the generated second object mask 348A having the second object boundary 348B. The generated second object mask 348A having the second object boundary 348B corresponds to the refined first object mask 304A with the refined first object boundary 304B. The final segmentation result 350 may be free of any artifacts, such as the zero-depth or dot-like artifacts, the dangling-pixels artifact 326, the self-shadow, and the like.

Figure 3L:
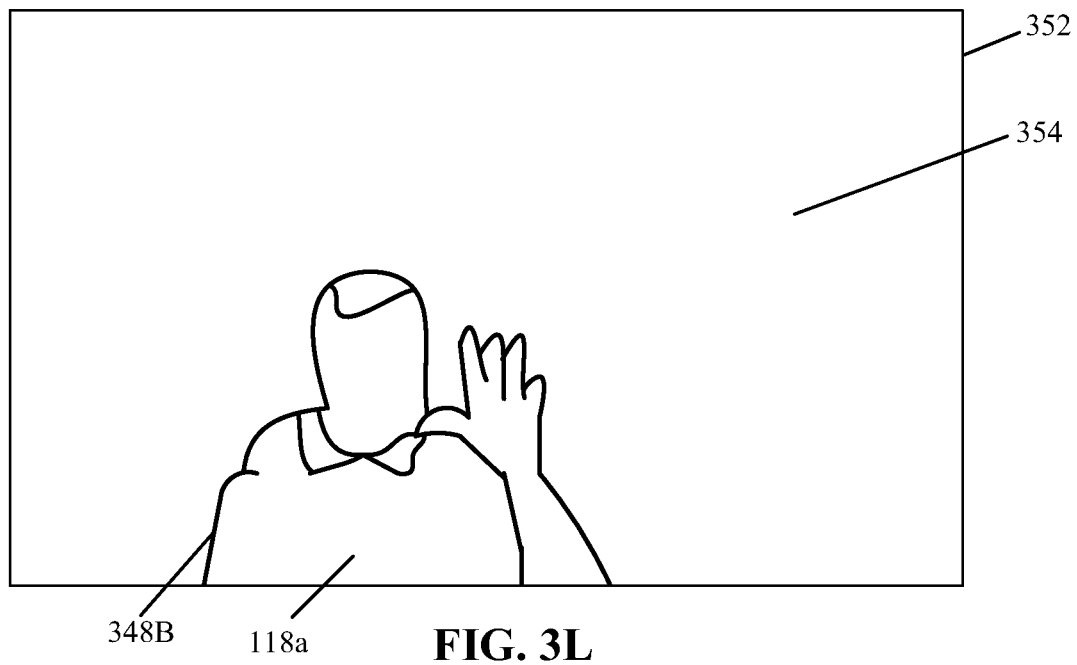

Now returning to FIG. 3A, at 314, the image processor 202 may be configured to retrieve a new RGB image to provide a new background to the first foreground object 118a. The new RGB image may be different from the RGB image 110a. FIG. 3L illustrates a background substitution operation for the extracted object-of-interest, such as the first foreground object 118a. Now referring to FIG. 3L, there is shown an image 352 and a background 354 of the image 352. The image-processing apparatus 102 may be configured to embed the extracted object-of-interest, such as the first foreground object 118a, into a new image, such as the image 352, which provides a new background, such as the background 354 for the first foreground object 118a. Usually, the embedding of the extracted object-of-interest, such as the first foreground object 118a, in the new background, is noticeable due to a change in the color-brightness values between the first foreground object 118a and the new background, such as the background 354.

Figure 3M:
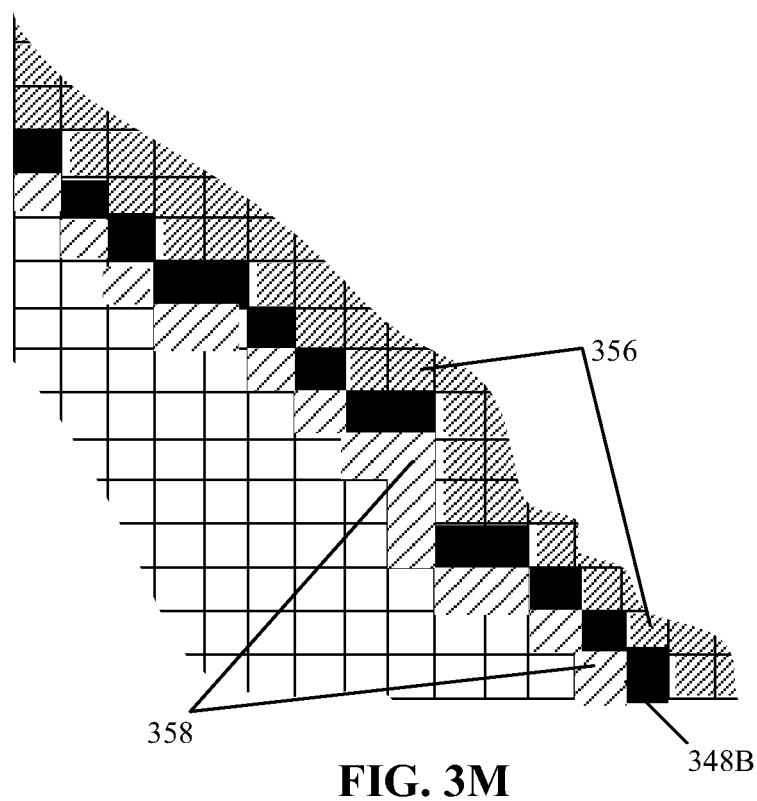

Now returning to FIG. 3A, at 316, the object blending processor 206 may be configured to finally apply a blending operation to the second object boundary 348B with the new background for a smooth color-brightness transition to the new background. FIG. 3M illustrates a blending operation applied to the refined object boundary of the object-of-interest in a new image for a smooth color-brightness blend to a new background. Now referring to FIG. 3M, there is shown an external-to-object layer 356, a next-to-object internal layer 358, and the second object boundary 348B. The external-to-object layer 356 refers to background pixels outside the second object boundary 348B. In accordance with an embodiment, the number of pixels selected in the external-to-object layer 356 may depend on image resolution of the new image, and an extent of pixel-level accuracy of the final segmentation result 350. For example, the external-to-object layer 356 may be three background pixels layer of the new background, such as the new background 354, outside the second object boundary 348B. In some embodiments, the external-to-object layer 356 may be one pixel layer of the new background outside the second object boundary 348B. The next-to-object internal layer 358 refers to foreground pixels of the first foreground object 118a inside the second object boundary 348B. The object blending processor 206 may be configured to apply a blending operation to the second object boundary 348B of the object-of-interest, such as the first foreground object 118a, in the new image (such as the image 352) for a smooth color-brightness blend to the new background (such as the background 354). The object blending processor 206 may be configured to determine whether a boundary pixel of the second object boundary 348B is located between a significantly different (in their color-brightness) internal pixels of the next-to-object internal layer 358 and external pixels of the external-to-object layer 356. In such cases, where the different in the color-brightness values of the internal pixels and the external pixels is greater than a threshold number, then the object blending processor 206 may be configured to change the color-brightness value of the boundary pixel to provide a smooth blending. Alternatively stated, at least one of a color value or a brightness value of the boundary pixel of the second object boundary 348B may be updated. The update may be done based on a difference between the color value or the brightness value of the boundary pixel and a set of pixels adjacent to the boundary pixel. The set of pixels adjacent to the boundary pixel includes a first number of pixels within the object-of-interest (i.e. the next-to-object internal layer 358) and a second number of pixels in the new background (i.e. in the external-to-object layer 356 of the background 354) of the new image (such as the image 352). For example, the new color-brightness value for the boundary pixel may be set as a 50-50% mix of the internal pixels and the external pixels. Such 1-pixel blending of the second object boundary 348B combined with the object boundary stabilization may provide accurate and visually perceptible artifacts free blending.

Figure 4A:
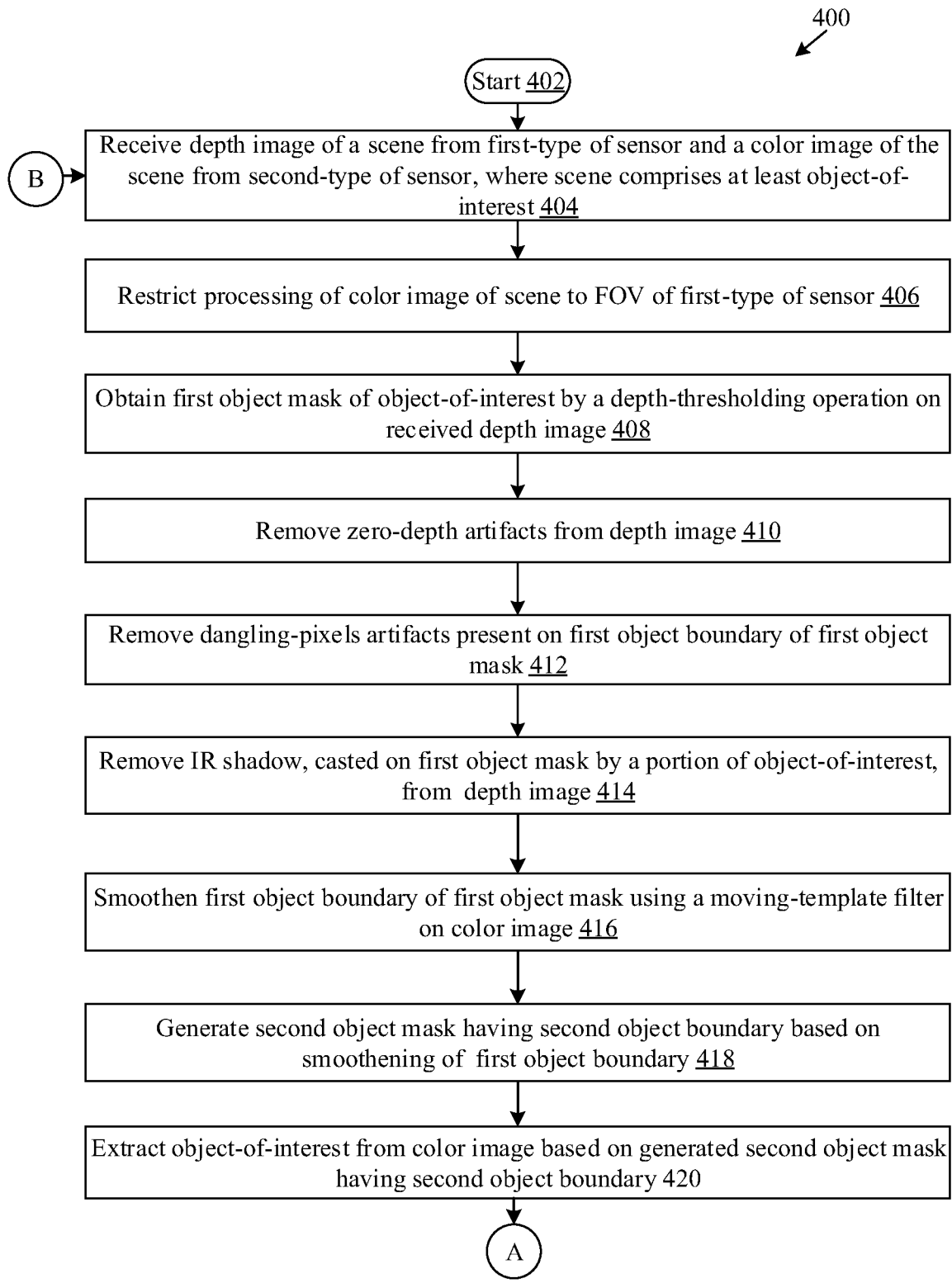
FIGS. 4A and 4B, collectively, depict a flow chart that illustrates an exemplary method for object boundary stabilization in an image of a sequence of image frames, in accordance with an embodiment of the disclosure.
Figure 4B:
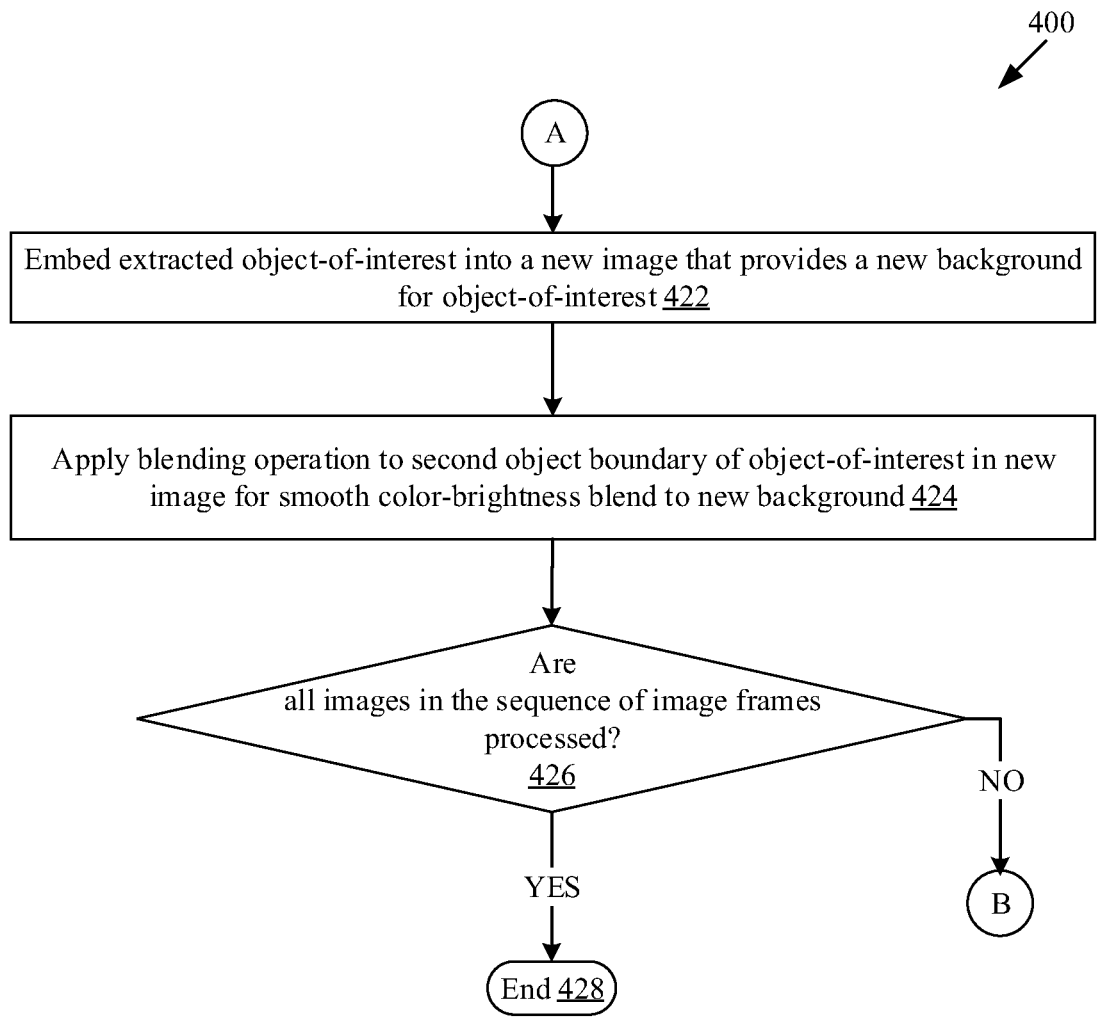

FIGS. 4A and 4B, collectively, depict a flow chart that illustrates an exemplary method for object boundary stabilization in an image of a sequence of image frames, in accordance with an embodiment of the disclosure. With reference to FIGS. 4A and 4B, there is shown a flow chart 400. The flow chart 400 implemented in the image-processing apparatus 102, is described in conjunction with elements from FIGS. 1A, 1B, 2, and 3A to 3M. The method starts at 402 and proceeds to 404.

At 404, a depth image of a scene from the first-type of sensor 104a and a color image of the scene from the second-type of sensor 104b, may be received. The scene may comprise at least an object-of-interest. The image processor 202 may be configured to receive the depth image (e.g. the depth image 112a) of a scene (e.g. the scene 114) from the first-type of sensor 104a (e.g. a depth sensor). The image processor 202 may also receive a color image (e.g. the RGB image 110a) of the same scene from the second-type of sensor 104b (e.g., an RGB image sensor). In some embodiments, where the sensor circuitry 104 is an external sensor device communicatively coupled to the image-processing apparatus 102, the depth image and the color image may be received by the image processor 202, via the network interface 210.

At 406, processing of the color image of the scene may be restricted to the FOV of the first-type of sensor 104a. Alternatively stated, the color image of the scene may be processed up to an area of the color image that is equivalent to the FOV of the first-type of sensor 104a that captures the depth image of the same scene. For example, as shown in FIG. 1B, to resolve the 0-depth artifact in the region 122a, the image processor 202 may be configured to restrict processing of the RGB image 110a of the scene 114 to the FOV of the first-type of sensor 104a, as shown by parallel dotted lines.

At 408, a first object mask of the object-of-interest may be obtained by a depth thresholding operation on the received depth image. A plurality of depth values that are greater than a threshold depth value may be excluded by the depth thresholding operation to obtain the first object mask. The threshold depth value may correspond to a maximum depth value associated with pixels of the first object mask of the object-of-interest. For example, the image processor 202 may be configured to obtain the first object mask 304A having the first object boundary 304B of an object-of-interest, such as the first foreground object 118a, by a depth thresholding operation on the received depth image 112a (FIG. 3A). The depth information as received from modern depth sensors, such as the first-type of sensor 104a, are usually imperfect, and thus the depth image 112a contain shadowy areas, such as the regions 122a to 122d, and the region 124, as observed and discussed in FIG. 1B. The imperfectness in depth map, such as the depth image 112a, may result in significant fluctuations on a boundary, such as the first object boundary 304B, of an object, especially visible between frames of a sequence of image frames.

At 410, zero-depth artifacts may be removed from the depth image. The zero-depth artifacts may correspond to areas with unknown depth values in the depth image. The pixels associated with the unknown depth values may be classified as background pixels or foreground pixels based on specified criteria for the removal of the zero-depth artifacts. For example, the image processor 202 may be configured to remove dot-like artifacts on and around the first object mask 304A, as shown by operation 306A. The dot-like artifacts correspond to the zero-depth artifacts. An example of the removal of zero-depth artifacts on and around the first object mask 304A is further described by the zero-depth classification map 318 in the FIG. 3B.

At 412, dangling-pixels artifact present on a first object boundary of the first object mask, may be removed. For example, the image processor 202 may be configured to remove dangling-pixels artifact 326 present on the first object boundary 304B of the first object mask 304A, as described in FIG. 3C. The image processor 202 may be configured to tag a pixel as a dangling-pixel at the first object boundary 304B when the pixel in a "3×3" pixels vicinity has at least one depth-undefined pixel (for example, a pixel that contain a zero-depth value). Once the dangling-pixels artifact 326 are identified and tagged, the dangling-pixels artifact 326 may be removed.

At 414, an IR shadow casted on the first object mask by a portion of the object-of-interest, may be removed from the depth image. For example, the image processor 202 may be configured to remove self-shadow from the first object mask 304A. FIG. 3D illustrates removal of the self-shadow region 328 in the first object mask 304A, in an example. In accordance with an embodiment, a background region outside the first object mask may be dynamically updated in the color image before removal of the IR shadow.

At 416, the first object boundary of the first object mask may be smoothened using a moving-template filter on the color image after removal of the dangling-pixels artifact and other artifacts. The smoothening of the first object boundary 304B using the moving-template filter 330 may be understood from FIGS. 3E, 3F, 3G, 3H, and 3I.

At 418, a second object mask having a second object boundary may be generated based on the smoothening of the first object boundary. For example, the image processor 202 may be configured to generate the second object mask 348A having the second object boundary 348B based on the smoothening of the first object boundary 304B, as shown and described in the FIG. 3J.

At 420, the object-of-interest from the color image may be extracted based on the generated second object mask having the second object boundary. An example of object-of-interest extraction is shown and described in the FIG. 3K, where the final segmentation result 350, such as the first foreground object 118a may be delineated from the background 116a of the RGB image 110a.

At 422, the extracted object-of-interest may be embedded into a new image that provides a new background for the object-of-interest. For example, as shown and described in the FIG. 3L, the image-processing apparatus 102 may be configured to embed the extracted object-of-interest, such as the first foreground object 118a, into a new image, such as the image 352, which provides a new background, such as the background 354 for the first foreground object 118a.

At 424, a blending operation may be applied to the second object boundary of the object-of-interest in the new image for a smooth color-brightness blend to the new background. An example of the blending operation is described in the FIG. 3M. The object blending processor 206 may be configured to apply a blending operation to the second object boundary 348B of the object-of-interest, such as the first foreground object 118a, in the new image (such as the image 352) for a smooth color-brightness blend to the new background (such as the background 354).

At 426, it may be checked whether all image frames, such as the color image, of a sequence of image frames are processed. In cases where not all the image frames of the sequence of image frames are processed, control may return to 404 to repeat the object extraction and blending process, for a next image frame. The process may repeat unit all the sequence of the image frames are processed, and a new video is generated with the substituted background. In cases where all the image frames of the sequence of image frames are processed, the control may then pass to end 428.

In accordance with an embodiment of the disclosure, an image-processing system for object boundary stabilization in an image (e.g. the RGB image 110a) of a sequence of image frames is disclosed. The image-processing system may include the image-processing apparatus 102 (FIG. 1A), which may comprise at least one image processor (such as the image processor 202 (FIG. 2)). The image processor 202 may be configured to receive a depth image (e.g. the depth image 112a) of a scene (e.g. the scene 114) from the first-type of sensor 104a and a color image (e.g. the RGB image 110a) of the scene from the second-type of sensor 104b. The scene may comprise at least an object-of-interest (e.g. the first foreground object 118a). The image processor 202 may be further configured to obtain a first object mask (e.g. the first object mask 304A) of the object-of-interest by a depth thresholding operation on the received depth image. The image processor 202 may be further configured to remove dangling-pixels artifact (e.g. the dangling-pixels artifact 326) present on a first object boundary (e.g. the first object boundary 304B) of the first object mask. The image processor 202 may be further configured to smoothen the first object boundary of the first object mask using a moving-template filter (e.g. the moving-template filter 330) on the color image after removal of the dangling-pixels artifact. The image processor 202 may be further configured to generate a second object mask (e.g. the second object mask 348A) having a second object boundary (e.g. the second object boundary 348B) based on the smoothening of the first object boundary. The image processor 202 may be further configured to extract the object-of-interest (e.g. the final segmentation result 350) from the color image based on the generated second object mask having the second object boundary.

There are certain challenges in the depth-based object segmentation and object blending methods. In depth-based object segmentation methods, the use of a depth map for an object segmentation may allow avoidance of many uncertainties in the object delineation process, as compared methods that use a color image (e.g. the RGB image 110a) alone. However, existing depth sensors (such as the first-type of sensor 104a) that provide depth image (e.g. depth map) still lack in accuracy and lag to match up with the increasing resolution of RGB cameras (such as the second-type of sensor 104b). For example, the received depth image 112a from the depth sensors may contain shadowy areas, where the light from infrared (IR) emitters of depth sensors do not propagate, resulting in areas with unknown depth, causing zero-depth artifacts. The zero-depth artifacts correspond to the areas with unknown depth values, for example, the regions 122a,122b,122c, and 122d, in the depth image 112a. In addition, the depth information may be most uncertain at the boundary of an object, where the depth drops sharply, and strongly fluctuates between image frames. The imperfectness in the depth information of modern depth sensors results in significant fluctuations on the boundary of a segmented object, especially visible between frames of a sequence of image frames, for example, a movie or other videos. The resulting artifacts are noticeable and visually unpleasant to a viewer. For example, the dangling-pixels artifact 326 are caused due to the chaotic depth, as shown in region 124 (FIGS. 1B, and 3A), in the depth image 112a. Further, in certain scenarios, a portion of a foreground object, such as the first foreground object 118a, may cast a shadow on itself, referred to as the self-shadow. The self-shadow region 328 corresponds to the region 122d (FIGS. 1B and 3A). The disclosed image-processing apparatus 102 and the method for object boundary stabilization in an image of a sequence of image frame solves the above challenges of the depth-based object segmentation. The image processor 202 may be configured to execute sequential refinement operations to reduce an amount of the object boundary fluctuation for the object-of-interest. The image processor 202 may be configured to utilize both the depth image and the color image to accurately identify a boundary of an object-of-interest. Typical artifacts in the depth map, which are characteristic of the depth sensors, such as the first-type of sensor 104a, may be removed by the sequential refinement operations, for example, as described by the operations 304, 306A, 306B, 308, 310, 312, and 316 in the processing pipeline 300 of FIG. 3A. Further, there are many advantages of the moving-template filter 330 that acts as a flexible and a directional filter. For example, the geometry of the moving-template filter 330 may be adjusted to a local geometry of object's boundary, such as the first object boundary 304B. Further, the smoothening by the moving-template filter 330 is invariant to the non-local brightness transformation. Further, the smoothening by the moving-template filter 330 is very fast as compared to conventional methods having a simplified complexity of the number of boundary pixels multiplied by the search length and the total number of pixels in the moving-template filter 330.

Additionally, the embedding of the extracted object-of-interest, such as the first foreground object 118*a*, in the new background, is usually noticeable due to a change in the color-brightness values between the first foreground object 118*a* and the new background, such as the background 354. However, as the object blending processor 206 applies a blending operation to the second object boundary 348B with the new background, as described in FIG. 3M, a smooth color-brightness transition to the new background, may be achieved. In certain scenarios, such 1-pixel blending of the second object boundary 348B combined with the object boundary stabilization may provide accurate and visually artifacts-free blending. The operations performed by the image processor 202 and the object blending processor 206 make the image-processing apparatus 102 itself more robust for object boundary stabilization by use of the moving-template filter 330 after removal of different artifacts as compared to conventional methods of depth-based object segmentation.

Various embodiments of the disclosure may provide a non-transitory computer readable medium and/or storage medium, where there is stored therein, a set of instructions executable by a machine and/or a computer for object boundary stabilization in an image of a sequence of image frames. The set of instructions may cause the machine and/or computer to receive a depth image (e.g. the depth image 112*a*) of a scene (e.g. the scene 114) from the first-type of sensor 104*a* and a color image (e.g. the RGB image 110*a*) of the scene from the second-type of sensor 104*b*. The scene may comprise at least an object-of-interest (e.g. the first foreground object 118*a*). A first object mask (e.g. the first object mask 304A) of the object-of-interest may be generated by a depth thresholding operation on the received depth image. Dangling-pixels artifact (e.g. the dangling-pixels artifact 326) present on a first object boundary (e.g. the first object boundary 304B) of the first object mask, may be removed. The first object boundary of the first object mask may be smoothened using a moving-template filter (e.g. the moving-template filter 330) on the color image after removal of the dangling-pixels artifact. A second object mask (e.g. the second object mask 348A) having a second object boundary (e.g., the second object boundary 348B) may be generated based on the smoothening of the first object boundary. The object-of-interest (e.g. the final segmentation result 350) from the color image may be extracted based on the generated second object mask having the second object boundary.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An image-processing apparatus, comprising:
at least one image processor configured to:
  receive a depth image of a scene from a first-type of sensor and a color image of said scene from a second-type of sensor, wherein said scene comprises at least an object-of-interest;
  obtain a first object mask of said object-of-interest by a depth thresholding operation on said received depth image;
  remove dangling-pixels artifact from a first object boundary of said first object mask;
  smoothen said first object boundary of said first object mask by application of a moving-template filter on said color image after said removal of said dangling-pixels artifact; and
  generate a second object mask having a second object boundary based on said smoothen of said first object boundary;
  extract said object-of-interest from said color image based on said generated second object mask having said second object boundary; and
  embed said extracted object-of-interest into a new image, wherein said new image includes a new background for said object-of-interest.

2. The image-processing apparatus according to claim 1, wherein said at least one image processor is further configured to process said color image of said scene, up to an area of said color image that is equivalent to a field-of-view (FOV) of said first-type of sensor, for said extraction of said object-of-interest from said color image.

3. The image-processing apparatus according to claim 1, wherein
said at least one image processor is further configured to exclude a plurality of depth values greater than a threshold depth value by said depth thresholding operation, and
said threshold depth value corresponds to a maximum depth value associated with pixels of said first object mask of said object-of-interest.

4. The image-processing apparatus according to claim 1, wherein
said at least one image processor is further configured to remove zero-depth artifacts from said depth image, and
said zero-depth artifacts correspond to areas with unknown depth values in said depth image.

5. The image-processing apparatus according to claim 4, wherein said at least one image processor is further configured to classify pixels associated with said unknown depth values as one of background pixels or foreground pixels based on specified criteria.

6. The image-processing apparatus according to claim 1, wherein said at least one image processor is further configured to remove, from said depth image, an infrared (IR) shadow casted on said first object mask by a portion of said object-of-interest.

7. The image-processing apparatus according to claim 1, wherein said at least one image processor is further configured to dynamically update a background region outside said first object mask in said color image.

8. The image-processing apparatus according to claim 1, wherein said moving-template filter is positioned on said color image to encompass a boundary pixel of said first object boundary such that said moving-template filter includes a first set of pixels in an interior region of said first object mask and a second set of pixels in an exterior region outside said first object mask.

9. The image-processing apparatus according to claim 8, wherein
said at least one image processor is further configured to find pixels with a maximum image gradient along a normal to said first object boundary within said moving-template filter, and
said normal to said first object boundary defines a direction in which image gradients are computed.

10. The image-processing apparatus according to claim 8, wherein said at least one image processor is further configured to compute a difference in a color value and a difference in a brightness value between said first set of pixels and said second set of pixels.

11. The image-processing apparatus according to claim 10, wherein
said at least one image processor is further configured to identify said boundary pixel as a candidate pixel for said smoothen of said first object boundary, and
said boundary pixel is identified based on said computed difference in said color value and said brightness value.

12. The image-processing apparatus according to claim 1, wherein said at least one image processor is further configured to apply a blending operation to said second object boundary of said object-of-interest in said new image for a smooth color-brightness blend to said new background.

13. The image-processing apparatus according to claim 12, wherein
said at least one image processor is further configured to update at least one of a color value or a brightness value of a boundary pixel of said second object boundary; based on a difference between said color value or said brightness value of said boundary pixel and a set of pixels adjacent to said boundary pixel, and
said set of pixels includes a first number of pixels within said second object mask and a second number of pixels in said new background of said new image.

14. A method for object boundary stabilization, comprising:
in an image-processing apparatus that comprises at least one image processor:
receiving, by said at least one image processor, a depth image of a scene from a first-type of sensor and a color image of said scene from a second-type of sensor, wherein said scene comprises at least an object-of-interest;
obtaining, by said at least one image processor, a first object mask of said object-of-interest by a depth thresholding operation on said received depth image;
removing, by said at least one image processor, dangling-pixels artifact from a first object boundary of said first object mask;
smoothening, by said at least one image processor, said first object boundary of said first object mask by application of a moving-template filter on said color image after said removal of said dangling-pixels artifact; and
generating, by said at least one image processor, a second object mask having a second object boundary based on said smoothening of said first object boundary;
extracting, by said at least one image processor, said object-of-interest from said color image based on said generated second object mask having said second object boundary; and
embedding said extracted object-of-interest into a new image, wherein said new image includes a new background for said object-of-interest.

15. The method according to claim 14, further comprising processing, by said at least one image processor, said color image of said scene, up to an area of said color image that is equivalent to a field-of-view (FOV) of said first-type of sensor, for said extraction of said object-of-interest from said color image.

16. The method according to claim 14, further comprising excluding, by said at least one image processor, a plurality of depth values greater than a threshold depth value by said depth thresholding operation, wherein said threshold depth value corresponds to a maximum depth value associated with pixels of said first object mask of said object-of-interest.

17. The method according to claim 14, further comprising removing, by said at least one image processor, zero-depth artifacts from said depth image, wherein said zero-depth artifacts correspond to areas with unknown depth values in said depth image.

18. The method according to claim 17, further comprising classifying, by said at least one image processor, pixels associated with said unknown depth values as one of background pixels or foreground pixels based on specified criteria.

19. The method according to claim 14, further comprising removing, from said depth image, by said at least one image processor, an infrared (IR) shadow casted on said first object mask by a portion of said object-of-interest.

20. The method according to claim 14, further comprising dynamically updating, by said at least one image processor, a background region outside said first object mask in said color image.

21. The method according to claim 14, wherein said moving-template filter is positioned on said color image to encompass a boundary pixel of said first object boundary such that said moving-template filter includes a first set of pixels in an interior region of said first object mask and a second set of pixels in an exterior region outside said first object mask.

22. The method according to claim 21, further comprising finding, by said at least one image processor, pixels with a maximum image gradient along a normal to said first object boundary within said moving-template filter, wherein said normal to said first objects boundary define a direction in which image gradients are computed.

23. The method according to claim 21, further comprising computing, by said at least one image processor, a difference in a color value and a difference in a brightness value between said first set of pixels and said second set of pixels.

24. The method according to claim 23, further comprising identifying, by said at least one image processor, said boundary pixel as a candidate pixel for said smoothening of said first object boundary, wherein said boundary pixel is identified based on said computed difference in said color value and said brightness value.

25. The method according to claim 14, further comprising applying, by said at least one image processor, a blending operation to said second object boundary of said object-of-interest in said new image for a smooth color-brightness blend to said new background.

26. The method according to claim 25, further comprising updating, by said at least one image processor, at least one of a color value or a brightness value of a boundary pixel of said second object boundary, based on a difference between said color value or said brightness value of said boundary pixel and a set of pixels adjacent to said boundary pixel, wherein said set of pixels includes a first number of pixels within said second object mask and a second number of pixels in said new background of said new image.

27. The method according to claim 25, further comprising marking, by said at least one image processor, a pixel on said first object boundary as said dangling-pixels in case said pixel in a 3×3 pixel vicinity has at least one depth-undefined pixel.

28. An image-processing apparatus, comprising:
at least one image processor configured to:
receive a depth image of a scene from a first-type of sensor and a color image of said scene from a second-type of sensor, wherein said scene comprises at least an object-of-interest;
obtain a first object mask of said object-of-interest by a depth thresholding operation on said received depth image;
remove dangling-pixels artifact from a first object boundary of said first object mask;
smoothen said first object boundary of said first object mask by application of a moving-template filter on said color image after said removal of said dangling-pixels artifact,
wherein said moving-template filter is positioned on said color image to encompass a boundary pixel of said first object boundary such that said moving-template filter includes a first set of pixels located in an interior region of said first object mask and a second set of pixels located in an exterior region outside said first object mask;
find pixels with a maximum image gradient along a normal to said first object boundary within said moving-template filter, wherein said normal to said first object boundary defines a direction in which image gradients are computed;
generate a second object mask having a second object boundary based on said smoothen of said first object boundary and said pixels with said maximum image gradient; and
extract said object-of-interest from said color image based on said generated second object mask having said second object boundary.

* * * * *